United States Patent [19]

Shapiro

[11] Patent Number: 4,785,472

[45] Date of Patent: Nov. 15, 1988

[54] REMOTE TEACHING SYSTEM

[75] Inventor: Arthur Shapiro, Hoboken, N.J.

[73] Assignee: The Trustees of the Stevens Institute of Technology, Hoboken, N.J.

[21] Appl. No.: 48,158

[22] Filed: May 11, 1987

[51] Int. Cl.⁴ .................... H04M 11/08; G09B 5/06; G09B 7/00

[52] U.S. Cl. ..................................... 379/96; 379/105; 358/85; 434/307; 434/350

[58] Field of Search .................. 358/85; 379/102, 104, 379/105, 53, 54, 96; 434/335, 350, 339, 307

[56] References Cited

U.S. PATENT DOCUMENTS

| | | | |
|---|---|---|---|
| 3,077,038 | 2/1963 | Williams et al. | 35/9 |
| 3,233,346 | 2/1966 | Cornberg | 35/60 |
| 3,654,708 | 4/1972 | Brudner | 35/9 A |
| 4,682,957 | 7/1987 | Young | 434/307 |
| 4,689,022 | 8/1987 | Peers | 434/307 |

FOREIGN PATENT DOCUMENTS 1488654  10/1977  United Kingdom ................ 273/237

OTHER PUBLICATIONS

David Scott, "Electronic Teacher Links Far-Flung Classrooms," Popular Science, Feb. 1982, p. 60.

Scott, "Electronic Teacher" *Popular Science*, Feb. 1982 p. 60.

Optel "Telewriter 11-PC Conferencing System" product brochure undated.

Primary Examiner—Jin F. Ng
Assistant Examiner—Wing Fu Chan
Attorney, Agent, or Firm—Pennie & Edmonds

[57] ABSTRACT

A remote teaching system 2 includes a teacher station 4 and a plurality of student stations 6 which may be located at sites remote from one another. Each station 4, 6 includes a speaker telephone 122, 122' or other voice telephone set which is connectable to a telephone system 124 for voice communication among the various stations. Each station 4, 6 includes a video display monitor 14, 14' such as a television set and a video media player 16, 16' such as a video-tape cassette player connected to the video display monitor 14, 14'. Each student station 6 also includes a video-media-player controller 8', 22' which is connected to the video media player 16' of the student station 6 for controlling the playing of the player. The teacher station 4 includes a video-media-player master controller 8, 22 connected to the video media player 16 of the teacher station 4 for controlling the playing of the player. The video-media-player master controller 8, 22 of the teacher station 4 and the video-media-player controller 8', 22' of the student stations are connectable to the telephone system 124 for transmitting and receiving telephonic control signals over the telephone system, so that the playing of the video media player 16 of the teacher station 4 and the video media players 16' of the student stations 6 can be synchronized.

12 Claims, 4 Drawing Sheets

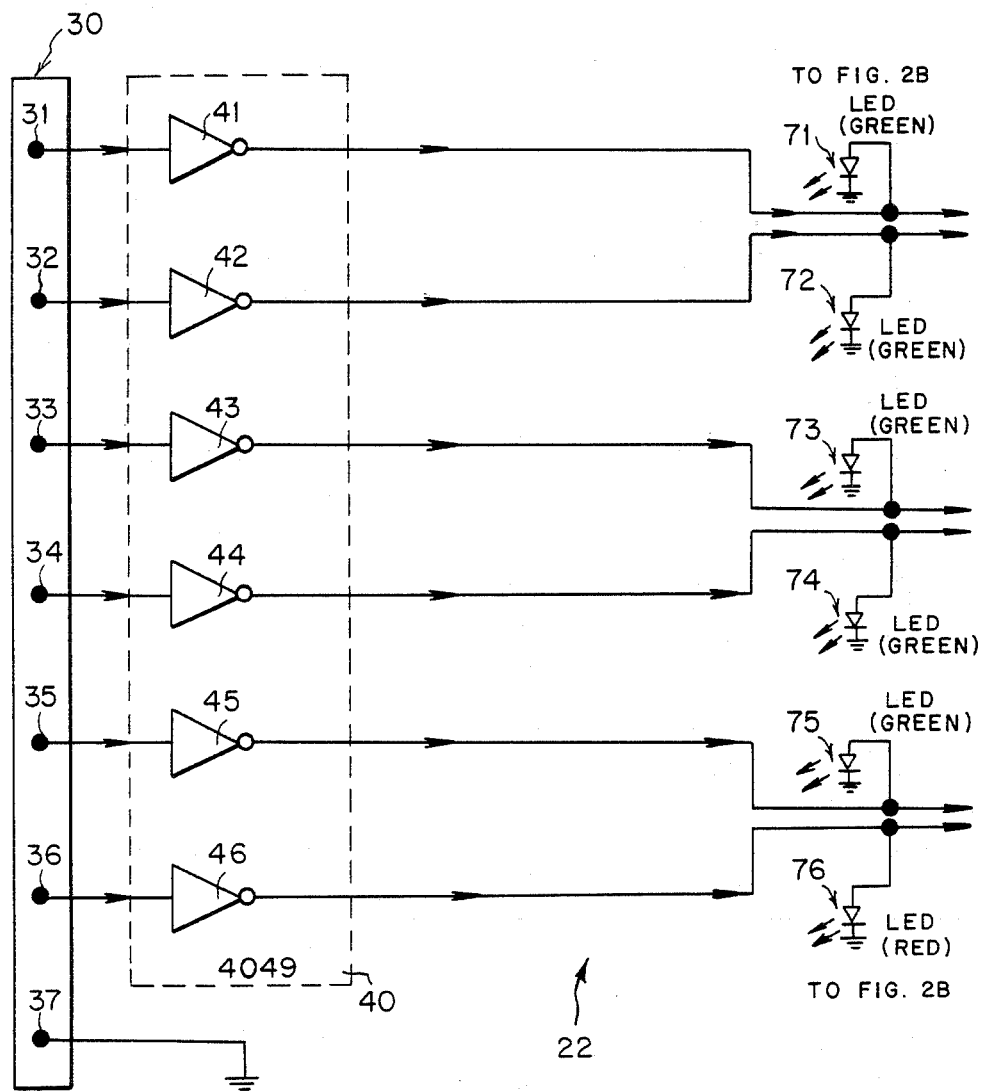

REMOTE TEACHING SYSTEM

TECHNICAL FIELD

The present invention concerns a system which permits a teacher to instruct a number of students in which the students and the teacher are dispersed among remote sites.

BACKGROUND ART

Instruction by a teacher of students assembled in a classroom is an effective method of teaching, since a student in a classroom can ask questions of the teacher and receive an immediate answer to clarify points of the lesson being taught which the student does not understand. In addition, the teacher can pose questions to students in the classroom and receive immediate replies to maintain the attentiveness of the students and to verify that the students are comprehending the lesson being taught.

However, it is often necessary to teach students who cannot be brought together in a classroom with a teacher. For example, it may be necessary to teach students who are hospitalized or who for some other reason cannot attend a classroom lecture. It may also be desired to provide instruction in a continuing-education program or employee-training program to persons no longer in school who live or work at widely dispersed sites and for whom it would be impractical to bring together in a classroom for instruction.

Various schemes involving televised or video-taped lectures have been tried for teaching students at sites remote from a teacher. However, no altogether satisfactory method has heretofore been available for teaching students located at sites remote from each other and the teacher.

One approach for teaching students in remote sites involves providing a direct television link between each student site and the teacher in parallel with a telephone link between the student sites and the teacher. In this way the lecture of the teacher can be transmitted "live" to each of the students and the students can ask questions of the teacher over the telephone link. However, a direct television link to a remote site is extremely expensive and consequently live broadcasts of a lecture with provision for student response by telephone is generally impractical for economic reasons, particularly when more than a few student sites are involved.

An article by D. Scott published in the February 1982 issue of Popular Science discloses a micro-processor-based audio-visual teaching system for linking students at widely scattered study centers and a teacher at a university. Terminal equipment for each study center consists of a microprocessor unit, a television set, two telephone lines and a stereo cassette recorder. Prerecorded lessons can be played on the stereo cassette recorder. One of the telephone lines is for audio communications and the other telephone line is for communicating visual information. The teaching system of the Scott article provides for talk-back and write-back from every terminal. Write-back is accomplished by means of a light pen. The system uses internal programs that can be taped, transmitted live or a mixture of the two. A teacher can make his or her own taped lessons by recording illustrative material with a television camera, making drawings on a graphics tablet, or entering typed information on a keyboard. The picture elements thus entered can be arranged and scaled on a video monitor to suit the teacher and then transferred to a stereo cassette tape. According to the article, the tape can be used by individual machines or sent over phone lines.

The audio-visual teaching system disclosed in the Scott article has a number of significant drawbacks. For example, conventional stereo cassette tapes have limited data storage capacity so that only a relatively limited set of images can be stored on the tape.

DISCLOSURE OF INVENTION

I have invented a remote teaching system which permits a teacher to instruct a plurality of students at widely separated remote sites and which avoids problems of the prior art noted above.

Broadly, the remote teaching system of the invention includes a teacher station and a plurality of student stations. The teacher station and the student stations may be located at remote sites which are interconnected by a telephone system.

Each station includes a voice telephone set which is connectable to the telephone system for voice communication among the various stations. Each station also includes a video display monitor such as a television set for displaying visual images. Each station also includes a video media player connected to the video display monitor for playing video media such as a video recorded lecture by a teacher to produce visual images on the display monitor. The video media player has a start/stop-control-signal input port and is adapted to start and stop the playing of video media in response to start/stop control signals applied to the start/stop-control-signal input port.

Each student station of the remote teaching system of the invention includes a video-media-player controller which is connected to the start/stop-control-signal input port of the video media player. The video-media-player controller is connectable to the telephone system for receiving telephonic start/stop control signals over the telephone system. The video-media-player controller is adapted to transmit start/stop control signals to the start/stop-control-signal input port of the video media player in response to receipt of telephonic start/stop control signals to controllably start and stop the playing of video media in the video media player.

The teacher station of the remote teaching system of the invention includes a video-media-player master controller which is connected to the start/stop-control-signal input port of the video media player of the teacher station. The video-media-player master controller is connectable to the telephone system for transmitting telephonic start/stop control signals over the telephone system. The video-media-player master controller is adapted to generate start/stop control signals in response to instructions from an operator of the master controller and to apply the signals to the start/stop-control-signal input port of the video media player of the teacher station. The video-media-player master controller is further adapted to transmit corresponding telephonic start/stop control signals over the telephone system to the video-media-player controllers of the studett stations, so that playing of the media player of the teacher station and the video media players of the student stations can be started and stopped substantially in synchronism.

Preferably, the video-media-player master controller includes a digital computer and a modem. The digital computer has random-access memory for storing data and programs, a central processing unit in communication with the random-access memory for accessing programs stored in the memory, a keyboard in communication with the random-access memory for entering data and programs into the memory, and an input/output channel. The digital computer preferably also includes a removable-media mass storage device such as a floppy magnetic disk storage unit for data and program entry and storage. The modem is connected to the input/output channel of the digital computer for receiving start/stop-control-signal communication commands from the computer. The modem is connectable to the telephone system for transmitting the telephonic start/stop control signals over the telephone system in response to the start/stop-control-signal communication commands. The input/output channel of the digital computer is also connected to the start/stop-control-signal input port of the video-media player of the teacher station for transmitting start/stop control signals to the video media player.

The video-media-player controller of each student station preferably comprises a digital computer and a modem. The digital computer has a random-access memory, a central processing unit, a keyboard, and an input/output channel as does the digital computer of the preferred video-media-player master controller of the teacher station. The digital computer of each student station also preferably includes a floppy magnetic disk storage unit or other removable-media mass storage device for data and program entry and storage. The input/output channel of the digital computer of the video-media-player controller of each student station is connected to the modem and to the start/stop-control-signal input port of the video media player of the student station. The modem of each student station is connectable to the telephone system for receiving telephonic start/stop control signals over the telephone system from the video-media-player master controller of the teacher station. The modem transmits start/stop-control-signal control commands to the digital computer in response to the telephonic start/stop control signals. The digital computer in turn transmits start/stop control signals to the start/stop-control-signal input port of the video media player for starting and stopping the playing of video media in the video media player of the student station.

The modems of the teacher station and the student stations are preferably integrated voice/data modems, so that the voice telephone set of each station can be connected to the telephone system through the modem. Integrated voice/data modems permit the teacher station and the various student stations to be interconnected over the telephone system by a single conference-call telephone link. Alternatively, if data-only modems are used, the modems of the student stations and the teacher station can be connected over the telephone system by a first conference-call telephone link for exchanging telephonic data signals among the modems, and the voice telephone sets of the teacher station and the student stations can be interconnected by a second conference-call telephone link. Generally telephone costs involved in operating the remote teaching system are significantly lower if the teacher station and the student stations are interconnected by one conference-call telephone link instead of two conference-call telephone links. Thus the use of integrated voice/data modems is generally preferred over the use of data-only modems.

Preferably, the input/output channel of the digital computer of the video-media-player controllers and the master controller includes a computer video-signal output port. The input/output channel of such a preferred digital computer is capable of generating a computer video signal at the computer video-signal output port for driving the video display monitor of the associated student or teacher station. Each of the student stations and the teacher station preferably includes an electrically-controlled double-throw video-signal switch. The electrically-controlled double-throw video-signal switch has a computer video-signal input port, a video-media-player video-signal input port, a display-monitor video-signal output port and a switch-control-signal input port. The double-throw video-signal switch is adapted to connect the display-monitor video-signal output port to one of the computer video-signal input port or the video-media-player video-signal input port in response to a video-signal-selection control signal applied to the switch-control-signal input port. The computer video-signal input port of the video-signal switch is connected to the computer video-signal output port of the digital computer of the station. The video-media-player video-signal input port is connected to a video-signal output port of the video signal switch. The switch-control-signal input port of the video-signal switch is connected to the input/output channel of the digital computer. Consequently, the video display monitor of the station can be caused to display either images generated by the digital computer or images from the video media player in response to video-signal-selection control signals generated by the digital computer and applied to the electrically-controlled double-throw video-signal switch.

The digital computer associated with each of the preferred student stations having a double-throw video-signal switch may be programmed to generate video-signal-selection control signals in response to telephonic video-signal-selection control signals received by the associated modem from a teacher station over the telephone system so that the teacher at the teacher station can control the source of the video signal displayed on the video display monitor of the student station. Programs and data for the digital computers of the student stations to generate graphic displays preferably can also be transmitted from the digital computer at the teacher station over the telephone system to the digital computers at the student stations. Preferably, the teacher station includes a graphics tablet or other graphics input device connected to the digital computer at the teacher station so that the teacher can readily enter digitally-encoded graphic images into the computer. For example, digitally-encoded graphic images could be entered by the teacher into the digital computer at the teacher station during a teaching session and transmitted to the digital computers at the student stations for display to the students during the session.

Preferably the video media players of the student stations and the teacher station are video-tape cassette players because of the ease by which video-tape cassettes may be recorded and distributed. Other video media players such as video disk players may be used if desired. If video-tape cassette players are used in the remote teaching system of the invention, a teacher would ordinarily prepare a video-taped lesson by televising and recording a lecture on video tape. Other televised study material could be included with the lecture if desired. Multiple copies of the video-taped lesson thus prepared would be made on video-tape cassettes, with one copy being provided for each student station and for the teacher station.

If desired, timing signals can be recorded on the audio channels of the video tapes and each digital computer provided with a timing-signal interface circuit connected to an audio-signal output port of the associated video-tape cassette player to permit the computer to monitor the timing signals. A digital computer so equipped can then identify specific portions of the video tapes by means of the timing signals. The use of such timing signals generally permits the synchronism of the playing of the various video-tape cassette players in a remote teaching system of the invention to be maintained accurately throughout the course of a teaching session.

Preferably, functions of the video-media players in addition to start and stop can be controlled by the video-media-player controller associated with each student and teacher station of the remote teaching system of the invention. For example, each video media player is preferably capable of performing the functions of fast forward (scan), reverse (scan), and pause to display a single image frame, in addition to the functions of start and stop in response to player-operation control signals applied to a player operation control-signal input port of the video media player. The video-media-player controller of each student station is preferably adapted to transmit player-operation control signals to the player-operation-control-signal input port of the video media player in response to receipt of telephonic player-operation control signals to control the operation of the video media player. The video-media-player master controller of the teacher station is preferably adapted to generate player-operation control signals in response to instructions from the operator and to apply the signals to the player-operation-control-signal input port of the video media player of the teacher station. The video-media-player master controller is also preferably adapted to transmit corresponding telephonic player-operation control signals over the telephone system to the video-media-player controllers of the student stations, so that operation of the video media player of the teacher station and the video media players of the student stations can be controlled substantially in synchronism with respect to the five functions of start, stop, fast forward, reverse, and pause to display a single image frame.

A preferred remote teaching system of the invention may be operated as follows. Pre-recorded video-tape cassettes of a video-taped lesson such as a video-taped lecture by the teacher are distributed to each remote student site in advance of a teaching session. At the beginning of the teaching session, the integrated voice/data modems at the remote student sites and at the teacher station are interconnected over a telephone system in a conference-call telephone link. The digital computer at each student station is loaded with a slave video-display control program and the digital computer at the teacher station is loaded with a master video-display control program. The teacher and the students initiate the running of the video-display control programs. Each student at a remote student site loads a video-tape cassette of the lecture into the video-cassette player at the site. The teacher at the teacher station similarly loads the video-tape cassette of the lecture into the video-tape cassette player at the teacher station. The teacher can then start and stop all of the video-tape cassette players at the various remote student sites and at the teacher station substantially in synchronism by entering commands into the digital computer at the teacher station from the keyboard. The start and stop commands for the video-tape cassette players are transmitted from the digital computer at the teacher station to the computers at the remote student sites via the voice/data modems and the telephone system. Since all of the video-tape cassette players are stopped and started substantially in synchronism, each of the video-tape cassette players plays essentially the same element of the tape at the same time.

If a student has a question about a point in the lecture playing on the video-tape cassette players, he or she can speak to the teacher over the voice telephone set at the remote site to ask the question. The other students will hear the question since the telephone sets are connected in a conference-call telephone link. Moreover, since all students are watching the same point in the video-taped lecture because of the synchronism of the playing of the video-tape cassette players, all of the students will be able to understand the context of the question with respect to the lecture.

To answer the question of a student, the teacher will typically first stop all of the video-tape cassette players by entering appropriate commands into the digital computer at the teacher station. The teacher may then respond to the question verbally over the voice telephone set at the teacher station to transmit a verbal response to the students at the remote student sites. Alternatively, the instructor can provide a written or typed response to the question. Written material such as a formula, diagram or sketch can be entered into the digital computer at the teacher station by means of a graphic tablet or other graphics input device; typed material can be entered by way of the keyboard of the computer. At the command of the teacher, the digital computer at the teacher station transmits such written or typed material to the digital computers at the remote student sites via the modems and telephone system. Upon receipt of telephonic video-signal-selection control signals from the teacher station, the computers at the remote student sites—by signalling the video-signal switches to which they are connected—display the written or typed material on the video monitors at the remote sites. After the response to the question has been transmitted to the students, the instructor can restart the video-tape cassette players to continue the taped lecture. Thus students receive the benefits of an immediate response to questions even though the students are located at sites remote from the teacher. In addition, the teacher can stop the video-tape cassette players at any point in the lecture and pose questinns to students individually or collectively. Because of the synchronism of the playing of the video-tape cassette players, the students will be able to understand the context of the teacher's questions with respect to the video-taped lecture.

The remote teaching system of the present invention permits students at scattered remote sites to receive the benefits of direct communication with a teacher during a video-taped lecture without the expense of providing direct television links between the teacher and the remote student sites.

BRIEF DESCRIPTION OF THE DRAWINGS

A preferred embodiment of the invention is described below with reference to the following drawings.

FIGS. 2A and 2B, together constitute a circuit diagram of an interface controller of the remote teaching system of FIG. 1.

BEST MODE FOR CARRYING OUT THE INVENTION

Figure 1:
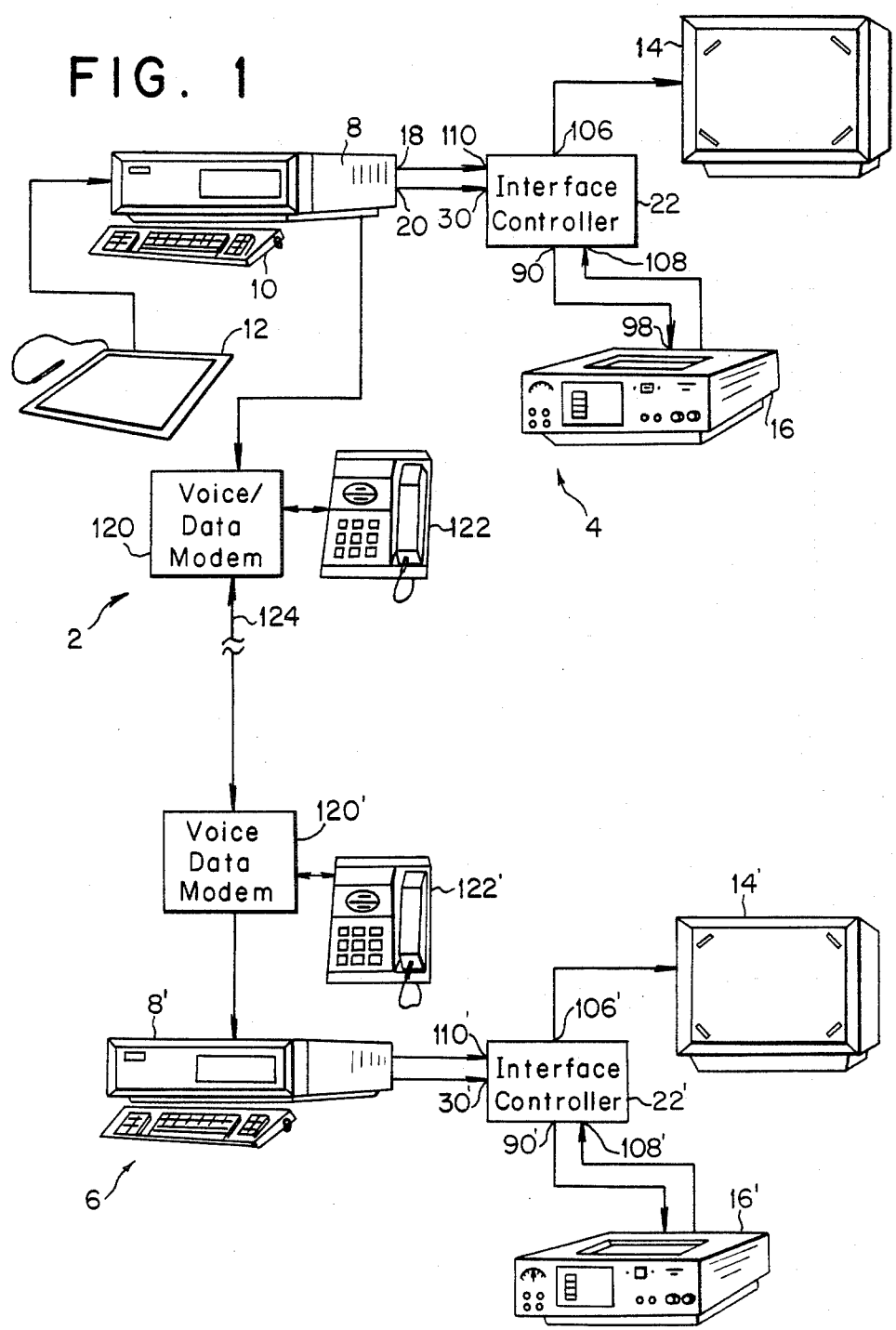
FIG. 1 is a schematic diagram of a teacher station and a student station of a preferred remote teaching system of the invention.

Referring now to FIG. 1, a remote teaching system 2 includes a teacher station 4 and a plurality of student stations 6, only one of which student station is shown in FIG. 1 for clarity.

The teacher station 4 comprises a digital computer 8, which includes a keyboard 10, random-access memory (not shown), a central processing unit (not shown) an input/output channel (not shown) and a floppy magnetic disk storage unit (not shown). A suitable digital computer is the "IBM Personal Computer" commercially available from IBM Corporation of Armonk, N.Y. or the "Professional 350" personal computer commercially available from Digital Equipment Corporation of Maynard, Massachusetts. A graphics tablet 12 is connected to the input/output channel of the digital computer 8 to permit graphics data to be entered into the computer.

The teacher station 4 includes a video display monitor 14 which is capable of displaying standard television video signals. A video-tape cassette player 16 is capable of playing conventional video-tape cassettes to generate video signals suitable for driving the video display monitor 14. A suitable video-tape cassette player 16 is the Model No. NV-8170 video cassette recorder, commercially aailable from JVC Company of America of Elmwood Park, New Jersey. The personal computer 8 has a computer video-signal output port 18 and a printer output port 20. The computer 8 is capable of generating video signals at the video-signal output port 18 suitable for driving the video display monitor 14. The printer output port 20 is of the parallel interface type.

An interface controller 22 interconnects the digital computer 8, the video-tape cassette player 16 and the video display monitor 14 and, as described in detail below, permits the digital computer 8 to control the operation of the video-tape cassette player 16 and enables the computer 8 to select the source of the video signal for the video display monitor 14.

Turning now to FIG. 2A, a control-signal input port 30 of the interface controller 22 has six control-signal input terminals 31-36 together with a ground-connection terminal 37. The control-signal input terminals 31-36 and ground connection 37 of the control-signal input port 30 are mounted within a connector adapted to mate with cable for a parallel-interface printer. Each of the input terminals 31-36 is connected respectively to the input of an inverting buffer 40-46. The six inverting buffers 41-46 are packaged together in an integrated circuit 40 of the 4049 hex buffer type. A suitable 4049 hex buffer integrated circuit is marketed by RCA Corporation of Summerville, N.J. under the trade designation "CD4049UB."

The output of each inverting buffer 41-46 is connected respectively to a light-emitting diode 71-76. The light-emitting diodes 71-76 are arranged on the face of a cover (not shown) for the interface controller 22 to provide an indication of the functioning of the controller. The output of each inverting buffer 41-46 is also connected to an actuating coil 87 of a five-volt single-pole single-throw relay 81-86 across a series-connected diode 78. A parallel-connected diode 80 is connected in parallel to the actuating coil 87 of the relay 81-86.

A suitable diode for the series and parallel-connected diodes 78 and 80 is signal diode type 1N914. The series-connected diode 78 isolates the output of the inverting buffer 41-46 from the actuating coil 87 of the relay 81-86. The parallel-connected diode 80 tends to suppress transient currents generated in energizing and de-energizing the actuating coil 87. Each relay 81-86 has a switch closure 88 which closes when the actuating coil 87 is energized.

A video-player control-signal output port 90 has five video-player control-signal output terminals 91-95 together with a common-connection terminal 97. Each of the video-player control-signal output terminals 91-96, corresponds to a video-player control-signal input terminal of a video-player control-signal input port 98 of the videotape cassette player 16. Electrical connection of a particular video-player control-signal input terminal to a common-connection terminal causes the videotape cassette player 16 to perform a specific function in connection with playing a video-tape cassette. The functions controlled by the video-player control-signal input terminals are start, fast forward (scan), reverse (scan), pause to display a single image frame, and stop. The video-player control-signal output port 90 is adapted to be connected to the video-player control-signal input port 98 of the video-tape cassette player 16 by a six conductor cable so that each of the five video-player control-signal output terminals 91-95 is connected to a corresponding video-player control-signal input terminal of the video-tape cassette player. The common-connection terminal 97 of the video-player control-signal output port 90 is likewise connected to a common connection terminal of the video-player control-signal input port 95.

One side of the switch closure 88 of a video-signal selection control relay 86 is connected to the supply voltage $V_{cc}$. The other side of the switch closure 88 is connected to an actuating coil 100 of a double-pole double-throw relay 102 across a series-connected diode 78. Two center movable arms 104 of the double-pole double-throw relay 102 are connected to a two-terminal video-display-monitor video-signal output port 106. One pair of contacts of the double-pole double-throw relay 102 are connected to a two-terminal video-player video-signal input port 108. The other pair of contacts of the relay 102 are connected to a two-terminal computer video-signal input port 110. When the actuating coil 100 of the double-role double-throw relay 102 is not energized, the two terminals of the video-player video-signal input port 108 are connected respectively to the two terminals of the video-display video-signal output port 106. When the actuating coil 100 of the double-pole double-throw relay 102 is energized, the two terminals of the computer video-signal input port 110 are connected respectively to the two terminals of the video-display-monitor video-signal output port 106. Thus the presence or absence of a control signal on a video-signal-selection control-signal input terminal 36 causes the video-display-monitor ideo-signal output port 106 be connected respectively to the computer video-signal input port 110 or to the video-player video-signal input port 108 of the interface controller 22.

Turning again to FIG. 1, a data-channel port of an integrated voice/data modem 120 is connected to the input/output channel of the digital computer 18. A speaker telephone 122 is connected to a voice-channel port of the voice/data modem 120. A suitable voice/data modem is commercially available from Optel Communications Inc. of New York, N.Y. under the trade designation "Voice Too Modem." A telephone-line connection port of the voice/data modem 122 is connected to a telephone system symbolized by telephone line 124 in FIG. 1.

Each student station 6 includes a voice/data modem 120', a speaker telephone 122', a digital computer 8', a video-display monitor 14', a video-tape cassette player 16', and an interface controller 22'. Except for the programming of the digital computer 8' of the student station 6, the components of the student station 6 are essentially identical to the corresponding components of the teacher station 4 described above and are interconnected in essentially the same way. For conciseness, that description will not be repeated.

Figure 2B:
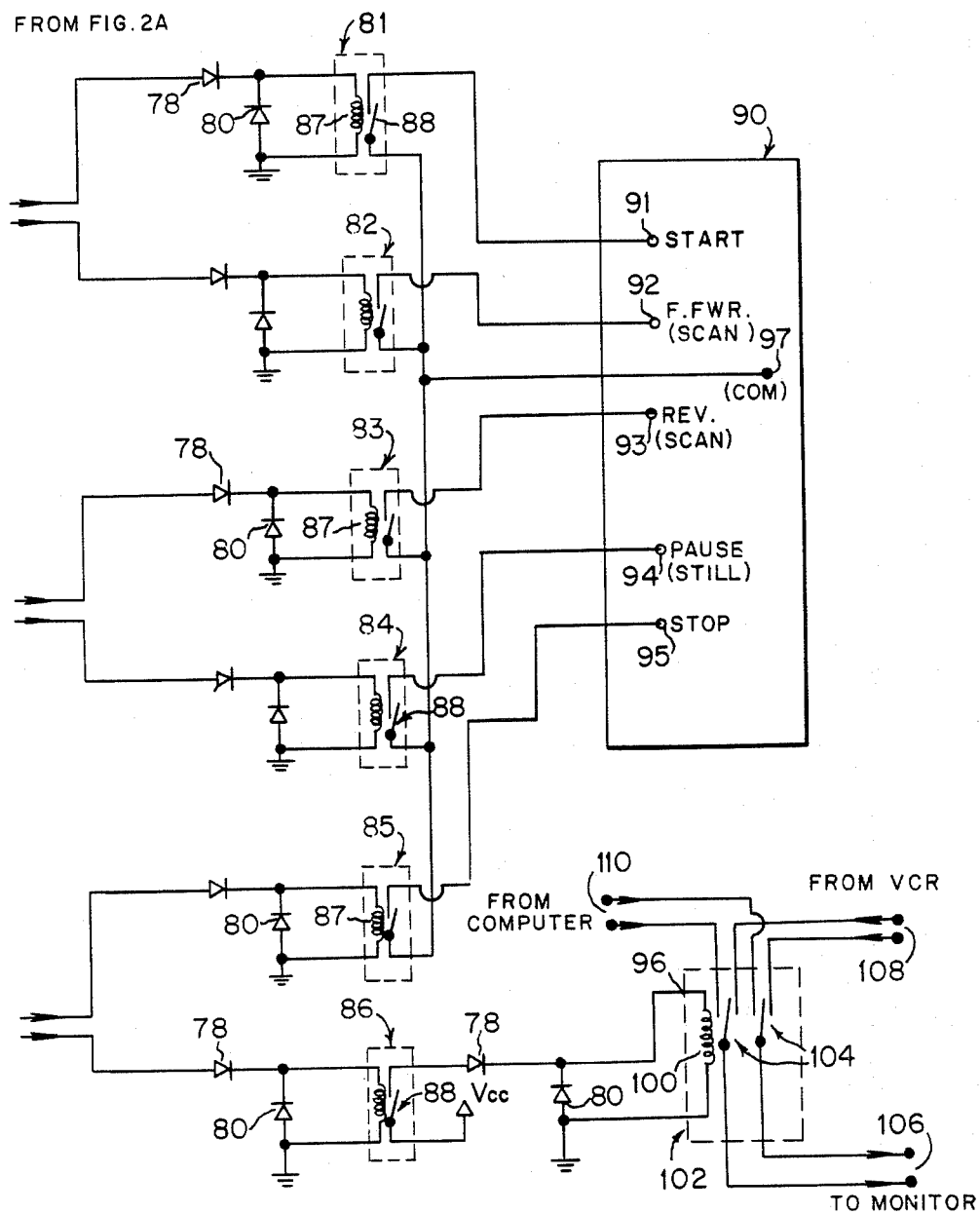
Figure 3:
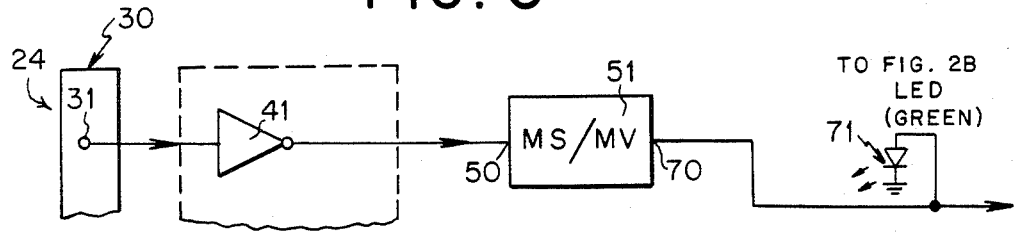
FIG. 3 is a partial circuit diagram of an alternative interface controller of the remote teaching system of FIG. 1.

Turning now to FIG. 3, an alternative interface controller 24 differs from the interface controller 22 discussed above in connection with FIGS. 2A and 2B in that the output of each inverting buffer 41–46 is connected respectively to a trigger input 50 of a corresponding monostable multivibrator 51–56. For simplicity, only one of the six inverting buffers 41–46 and only one of the six monostable multivibrators 51–56 is hown in FIG. 3, the other five inverting buffers and the other five monostable multivibrators being connected identically.

Figure 4:
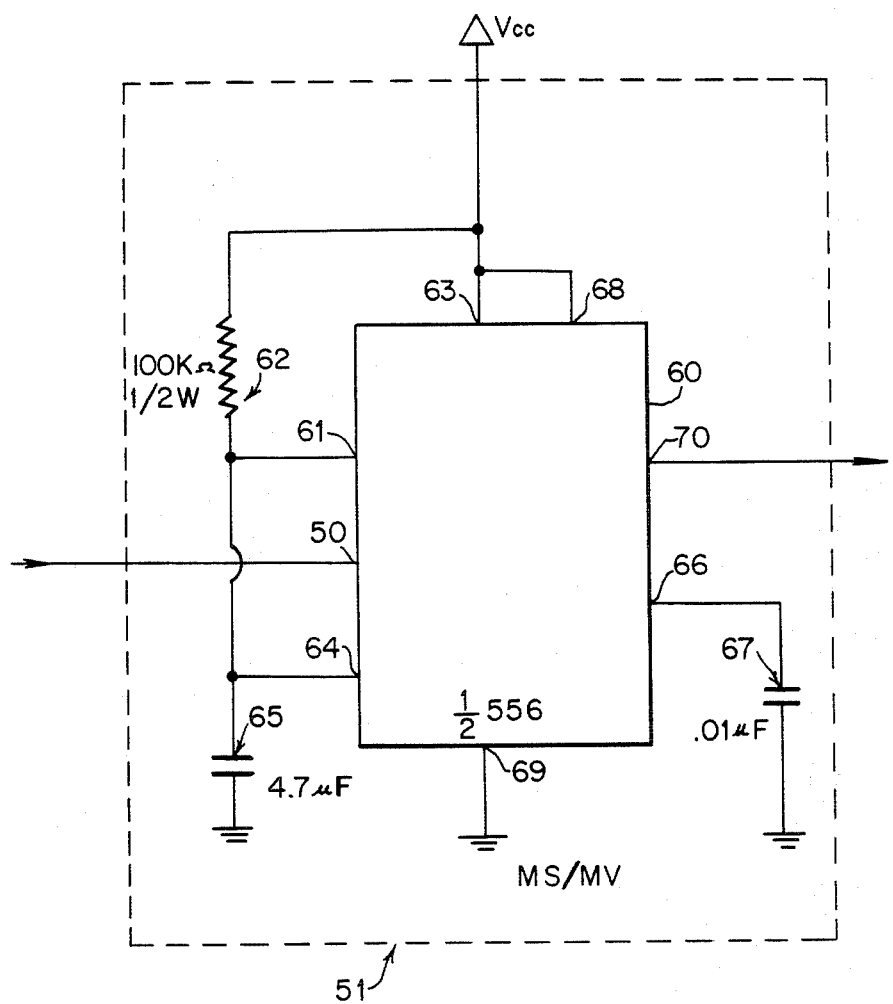
FIG. 4 is a circuit diagram of a monostable multivibrator employed in the alternative interface controller of FIG. 3.

As shown in FIG. 4, the monostable multivibrator 51 includes an integrated-circuit timer 60 configured as a monostable multivibrator. The integrated-circuit timer 60 is one half of a dual integrated-circuit timer of the 556 timer type. A suitable integrated circuit timer is marketed by Signetics Corporation of Sunnyvale, Calif. under the trade designation "SE556 Dual Timer." A threshold input 61 of the integrated circuit timer 60 is connected to a positive supply voltage $V_{cc}$ of about 5 volts across a resistor 62 having a resistance of about 100 kΩ. A reset input 63 of the integrated circuit timer 60 is tied directly to the supply voltage $V_{cc}$. A discharge input 64 of the integrated circuit timer 60 is connected directly to the threshold input 61 and is connected to signal ground across a capacitor 65 having a value of 4.7 μF. A control voltage input 66 is connected to signal ground across a capacitor 67 having a value of 0.01 μF. The supply voltage terminal 68 and the ground return terminal 69 of the integrated circuit 60 are connected respectively to the supply voltage $V_{cc}$ and to a signal ground. The monostable multivibrator 60 produces a pulse approximately 500 msec long at a pulse output 70 in response to a trigger signal applied to the trigger input 50.

Turning again to FIG. 3, the output 70 of each monostable multivibrator 51–56 of the alternative interface controller 24 is connected respectively as the output of the corresponding inverter buffer 41–46 of the interface controller 22 of FIGS. 2A and 2B is connected. As noted above, the remaining circuitry of the alternative interface controller 24 is identical to the circuitry of the interface controller 22. Reference is made to FIGS. 2A and 2B and the corresponding discussion above for a description of such circuitry.

In order to maintain a switch closure 88 of a particular relay 81–86 in a closed configuration in the alternative interface controller 24, a train of trigger pulses is applied to the corresponding control-signal input terminal 31–36. So long as the spacing between the trigger pulses is greater than the length of the pulse of the monostable multivibrator 51–56 by an amount less than a response time of the corresponding relay 81–86, the switch closure 88 of the relay remains in a closed configuration. The digital computer 8 can be programmed to generate such a train of trigger pulses on a particular terminal of the parallel printer port 30 in order to control the functions of the video-tape cassette player 16.

The preferred remote teaching system 2 of FIG. 1 may be used to conduct a teaching session as follows. Video cassettes containing essentially identical copies of a video-taped lecture are distributed to each of the student stations 6 and to the teacher station 4 in advance of the teaching session. At the start of the teaching session, the integrated voice/data modems 120, 120' of the teacher station 4 and the various student stations 6 are interconnected over the telephone system 124 in a conference-call telephone link. Thus the students at the student stations 6 and the teacher at the teacher station 4 can communicate by voice over the speaker telephones 122, 122'. At the instruction of the teacher over the speaker telephones, the students load the video-tape cassettes of the video-taped lecture in the video-tape cassette players 16' at the student stations 6. Similarly, the teacher loads his or her video-tape cassette in the video-tape cassette player 16 of the teacher station 4.

In advance of the teaching session, floppy magnetic disks containing a slave video-display control program are distributed to each student station. Each student loads the slave video-display control program into the digital computer 8' at his or her student station by inserting the floppy magnetic disk into the floppy-magnetic-disk storage unit of the digital computer 8' and entering the appropriate commands for loading a program on the keyboard of the computer.

At the instruction of the teacher over the speaker phones, the students at the student stations 6 initiate the execution of the slave video-display control program stored in the memories of the digital computer 8' at the student stations. The teacher initiates a master video-display control program stored in the digital computer 8 at the teacher station 4. Upon initiation, the video-display control programs cause each interface controller 22, 22' to connect the computer video-signal input port 110 of the controller to the video-display-monitor output port 106, so that the associated video display monitor 14, 14' displays a graphic start-up display from the computer to verify proper operation of the computer and the video display monitor. The video display programs also cause the video-tape cassette players 16, 16' to rewind the video tapes to an initial position.

The teacher then enters a video-tape start command through the keyboard 10 of the digital computer 8 at the teacher station 4. In response, the master video-display program causes the interface controller 22 of the teacher station 4 to connect the video-player video-signal input port 108 of the interface controller to the video-display monitor video-signal output port 106. The master video-display program also causes the video-tape cassette player 16 to begin playing the video-tape cassette mounted in the player. The program also causes a video-player-start control-signal communication command to be transmitted to the voice/data modem 120, which, in response, transmits a telephonic video-player start-control-signal over the telephone system 124 substantially simultaneously to the voice/-data modems 120' of each of the student stations 6. The voice/data modem 120' of each of the student stations 6 in response transmits a video-player-start control-signal control command to the associated-digital computers 8' of the student station 6. The slave video-display control program interprets the video-display start control-signal control command received from the voice/data modem 120' and causes the digital computer 8' to transmit control signals to the interface controller 22' at the student station to connect the videoplayer video-signal input port 108' of the interface controller to the video-display-monitor video-signal output port 106'. The slave video-display control program also causes the computer 8' to transmit a control signal to the video-display start-control-signal input terminal 31 of the interface controller 22', which in turn causes a video-display-start relay 81 to close. The video-tape cassette-player 16' at each student station 6 is thus caused to begin playing the video-tape cassette. Thus, video-tape cassette players 16, 16' of each of the student stations 6 and the teacher station 4 begin playing the video-taped lecture substantially in synchronism. Similarly, the master video-display control program running on the digital computer 8 at the teacher station can be used to cause the video-tape cassette players 16' at the student stations to scan forward, scan reverse, pause to display a single image frame, and stop —all essentially in synchronism —with the same functions performed by the video-tape cassette player 16 at the teacher station 4.

A listing of a master video-display control program for an "IBM Personal Computer" is attached hereto as Appendix A and made a part of this specification. A slave video-display control program for the same computer is attached as Appendix B and is also made a part of this specification.

It is not intended to limit the present invention to the specific embodiment described above. For example, the speaker telephones of the teacher station and the various student stations can be connected by a first conference-call telephone link and modems of the stations can be connected over a second conference-call telephone link. Timing signals can be recorded on the audio channels of the video tapes and monitored by the digital computers so that the computer can locate identical portions of the tapes by means of the timing signals. It is recognized that these and other changes may be made in the remote teaching system specifically described herein without departing from the scope and teaching of the instant invention and it is intended to encompass all other embodiments, alterations, and modifications consistent with the invention.

3675-010　　　　　　　　　　　　APPENDIX A

Master Video-Display Control Program

```
A>tvpe vip.asb
File not found

A>dir

Volume in drive A has no label
 Directory of  A:\

VIP         ASM       12600     1-01-80     12:04a
FE          EXE       45696    10-28-82     12:00p
FE          FRO        3283     4-27-84      4:28a
LINK        EXE       38144     3-07-85      1:43p
VIP         OBJ        2165     1-01-80     12:06a
VIP         EXE        1920     1-01-80     12:06a
VIP2        ASM        6778     1-01-80     12:10a
VIP2        OBJ        1240     1-01-80     12:11a
VIP2        EXE        1440     1-01-80     12:11a
RVIP        ASM       13951     1-01-80     12:17a
RVIP        OBJ        2075     1-01-80     12:16a
MODEM       ASM        3125     1-01-80     12:00a
MODEM       OBJ         447     1-01-80     12:01a
MODEM       EXE        1024     1-01-80     12:01a
TEMP        ASM       12444     1-01-80      1:02a
FINAL                 13292     1-01-80     12:51a
       16 File(s)      165888 bytes free
A>
A>type vip.asm
;
;         THIS IS THE MAIN PROGRAM
;         TO CONTROL ONE VCR
;
STACK    SEGMENT PARA STACK 'STACK'
         DB 256 DUP (0)
```

```
        STACK    ENDS
        ;
        EXTRA    SEGMENT PARA PUBLIC 'EXTRA'
        EXTRA    ENDS
        ;
        DATA     SEGMENT PARA PUBLIC 'DATA'
        ;
        ;
        ; BUFFERS FOR SIMPLE INPUT/OUTPUT :
        ; ------- --- ------ ------------
        ;
        INBUF    DB 1 DUP (0)              ; BUFFER FOR INPUT COMMAND
        BUTTON   DB 1 DUP (0)              ; BUFFER FOR STATUS BYTE FROM PAD
        ;
        ; LOOK UP TABLE :
        ; ---- -- -----
        ;
        TABLE    DW         59
                 DW           PLAY
                 DW         60
                 DW           STOP
                 DW         61
                 DW           FORWARD
                 DW         62
                 DW           REWIND
                 DW         63
                 DW           HOLD
                 DW         64
                 DW           SCREEN
                 DW         65
                 DW           DRAW
                 DW         66
                 DW           BYE
        ;
        ; COORDINATE FOR DRAW LINE ROUTINE :
        ; ---------- --- ---- ---- -------
        ;
        X1       DW         0
        X2       DW         0
        Y1       DW         0
        Y2       DW         0
        DELDY    DW         0
        DELDX    DW         0
        DELS     DW         0
        DELF     DW         0
        DELSX    DW         0
        DELSY    DW         0
        DELSE    DW         0
        DELDE    DW         0
        ;
        ; DATA FOR DRAW TO ROUTINE :
        ; ---- --- ---- -- -------
        ;
        XL       DW         0
        YL       DW         0
        ;
        ; DATA BUFFER FOR CONVERSIONS
        ;
        TBUFF    DB         20 DUP (0)
        ;
        ; END SESSION FLAG FOR PROCEDURE BYE
        ;
        ENDFLAG  DB         1 DUP (0)
        ;
        DATA     ENDS
```

```
;
;
CODE    SEGMENT PARA PUBLIC 'CODE'
;
MAIN    PROC    FAR
;
;
; INITIALIZE
; OPEN FILE AND GET FILE HANDLES
; -------------------------------
;
        ASSUME  CS:CODE         ; INITIALIZE PSP
        PUSH    DS              ; (PROGRAM SEGMENT PREFIX)
        MOV     AX,0
        PUSH    AX
        MOV     AX,DATA
        MOV     DS,AX
        ASSUME  DS:DATA
        MOV     AX,0B800H
        MOV     ES,AX
        ASSUME  ES:EXTRA
;
;
        CALL    INZ
;
; CLEAR THE KEYBOARD BUFFER AND
; GET A COMMAND FROM KEYBOARD
; -------------------------------
;
START:  CALL    INCOM           ; CALL PROCEDURE INPUT-COMMAND
;
;
; BRANCH TO APPROPRIATE
; COMMAND SUBROUTINE
; -------------------------------
;
        CALL    BRANCH          ; CALL PROCEDURE BRANCHING
;
;
; JUMP BACK TO GET ANOTHER COMMAND
; -------------------------------
;
        CMP     ENDFLAG,0
        JE      START           ; JUMP TO START
        RET
;

;
;       ROUTINE TO PLAY THE VCR
;
PLAY    PROC    NEAR
;
        PUSH    AX              ; SAVE REGISTERS
;
        MOV     AL,01H          ; TURN ON PLAY
        CALL    PP1OUT
;
        MOV     AL,0            ; TURN LED OFF
        CALL    PP1OUT
;
        MOV     AL,59
        CALL    CM1COM
;
        POP     AX
        RET
```

```
;
PLAY    ENDP
;
;       ROUTINE TO STOP BOTH REMOTE AND LOCAL VCRS
;
STOP    PROC    NEAR
;
        PUSH    AX              ; SAVE REGISTORS
;
        MOV     AL,10H
        CALL    PP1OUT
;
        MOV     AL,0
        CALL    PP1OUT
;
        MOV     AL,60
        CALL    CM1COM
;
;
        POP     AX
        RET
;
STOP    ENDP
;
;       ROUTINE TO DO FAST FORWARD AND FORWARD SCAN
;
FORWARD PROC    NEAR
;
        PUSH    AX              ; SAVE REGISTORS
;
        MOV     AL,02H
        CALL    PP1OUT
;
;
        MOV     AL,61
        CALL    CM1COM
;
        POP     AX
        RET
;
FORWARD ENDP

;
;       ROUTINE TO DO FAST REWIND AND BACKWARD SCAN
;
REWIND  PROC    NEAR
;
        PUSH    AX              ; SAVE REGISTORS
;
        MOV     AL,04H
        CALL    PP1OUT
;
;
        MOV     AL,62
        CALL    CM1COM
;
        POP     AX
        RET
;
REWIND  ENDP
;
;       ROUTINE TO PAUSE (HOLDING)
;       BOTH REMOTE AND LOCAL VCRS
;
```

```
HOLD     PROC    NEAR
;
         PUSH    AX                      ; SAVE REGISTORS
;
         MOV     AL,08H
         CALL    PP1OUT
;
         MOV     AL,0
         CALL    PP1OUT
;
         MOV     AL,63
         CALL    CM1COM
;
         POP     AX
         RET
;
HOLD     ENDP
;
;
; ROUTINT TO SWITCH SCREEN
;
SCREEN   PROC    NEAR
;
         PUSH    AX                      ; SAVE REGISTORS
;
         MOV     AL,30H
         CALL    PP1OUT
;
         MOV     AL,64
         CALL    CM1COM
;
         POP     AX
         RET
;
SCREEN   ENDP
;
; ROUTINE TO END SESSION
;
BYE      PROC    NEAR
;
         MOV     AH,0                    ; SET DISPLAY TO 320x200 COLOR
         MOV     AL,1
         INT     10H
;
         MOV     AL,66
         CALL    CM1COM
;
         MOV     AL,030H
         CALL    PP1OUT
;
         MOV     ENDFLAG,0FFH
         RET
;
BYE      ENDP
;

;
;
;
; ROUTINE TO USE ELECTRIC CHALK BOARD
; ( THE DRAWING ROUTINE )
;
;
DRAW     PROC    NEAR
;
```

```
        PUSH    AX                      ; SAVE RESTORES
        PUSH    BX
        PUSH    CX
        PUSH    DX
;
        MOV     AH,0                    ; INITIALIZE GRAPHIC SCREEN
        MOV     AL,6                    ;   640x200 BLACK AND WHITE
        INT     10H
;
;
        CALL    PADGO
;
        MOV     AL,65
        CALL    CM1COM
;
        CALL    SCREEN                  ; SWITCH DISPLAY FROM VCR TO COMPUTER
;
PTA:    MOV     AX,0B800H
        MOV     ES,AX                   ;
        CALL    CLS                     ; CLEAR VIDEO RAM
;
PTB:    CALL    GETPT                   ; CALL THIS POINT B (ONE)
;
        MOV     AH,0BH                  ; CHECK KEYBOARD
        INT     21H
        CMP     AL,0
        JNE     DECIDE                  ; IF THERE IS KEYBOARD ENTRY
;
        TEST    BUTTON,1
        JE      PTB
;
        CMP     SI,640
        JNC     PTB
        CMP     DI,440
        JNC     PTB
        CMP     DI,240
        JC      PTB
;
        MOV     XL,SI
        MOV     YL,DI
;
        MOV     BUTTON,0
        CALL    OUTPT
;
PTBX:   CALL    GETPT
        TEST    BUTTON,1
        JE      PTB
;
        CMP     SI,640
        JNC     PTBX
        CMP     DI,440
        JNC     PTBX
        CMP     DI,240
        JC      PTBX
;
        CALL    DRAWTO
;
        CALL    OUTPT
;
        JMP     PTBX                    ; GO CHECK KEYBOARD
;                                       ; AFTER PLOTTING A POINT
;
DECIDE: CALL    INCOM
        MOV     AL,INBUF
        CMP     AL,66                   ; IF EXIT
        JE      DONE                    ; JUMP OUT
;
        CMP     AL,67                   ; IF CLEAR-SCREEN
        JNE     PTB
```

```
;
        MOV     AL,67
        CALL    CM1COM
        JMP     PTA
;
;                               ; JUMP TO POINT 1 TO PLOT ANOTHER POINT
DONE:   MOV     AL,0
        CALL    PP1OUT
;
        CALL    PADHOLD
;
        MOV     AL,66
        CALL    CM1COM
;
        POP     DX              ; RESTORE REGISTORS
        POP     CX
        POP     BX
        POP     AX
        RET
;
DRAW    ENDP
;
;
; ROUTINE INPUT-COMMAND TO
; CLEAR THE KEYBOARD BUFFER
; AND TAKE A KEY FROM THE
; KEYBOARD
;
;
INCOM   PROC    NEAR
;
        PUSH    AX              ; SAVE REGISTOR
        PUSH    BX              ; SAVE REGISTOR
        PUSH    CX              ; SAVE REGISTOR
        PUSH    DX              ; SAVE REGISTOR
;
        MOV     AH,01H
        INT     21H
;
        MOV     INBUF,AL        ; AL CONTAINS THE INPUTED CHARACTER
;
        POP     DX              ; RESTORE REGISTOR
        POP     CX              ; RESTORE REGISTOR
        POP     BX              ; RESTORE REGISTOR
        POP     AX              ; RESTORE REGISTOR
        RET
;
INCOM   ENDP
;
;
;
; ROUTINE TO BRANCH TO THE APPROPRIATE ROUTINE
;   (CONTROLLING THE VCR)
;
BRANCH  PROC    NEAR
;
        PUSH    AX
        PUSH    BX
        PUSH    CX
        PUSH    DX
;
        MOV     CX,8            ; TOTAL NUMBER OF COMMANDS AVAILABLE
        MOV     BX,0
        MOV     AH,0
        MOV     AL,INBUF
```

```
AGAIN:   CMP     AX,TABLE[BX]           ; LOOK UP COMMAND FROM KEYBOARD
         JE      FOUND                  ; JUMP OUT IF FOUND
         INC     BX
         INC     BX
         INC     BX
         INC     BX
         LOOP    AGAIN                  ; LEAVE IF NO SUCH COMMAND

POP     DX
         POP     CX
         POP     BX
         POP     AX
         RET
;
FOUND:   INC     BX                     ; CALL THE SUBROUTINE
         INC     BX
         CALL    TABLE[BX]

POP     DX                     ; RESTORE REGISTORES AND LEAVE
         POP     CX
         POP     BX
         POP     AX
         RET
;
BRANCH   ENDP
;
;        ROUTINE TO CLEAR SCREEN
;
;
CLS      PROC    NEAR
         PUSH    CX
         PUSH    AX
;
         MOV     CX,2000H
         MOV     AX,0
         MOV     DI,AX
         CLD
;
         REP     STOSW
;
         POP     AX
         POP     CX
;
         RET
;
CLS      ENDP
;
; ROUTINE TO PLOT A POINT ON THE 640x200
; BLACK AND WHITE HIGH RESOLUTION SCREEN
;        -UPON ENTRY :
;                        SI: X-COORDINATE
;                        DI: Y-COORDINATE
;
SETPT    PROC    NEAR
;
         PUSH    AX                     ; SAVE REGISTOR
         PUSH    CX
         PUSH    DX
;
;
         MOV     CX,SI
         MOV     DX,DI
         MOV     AH,12                  ; PLOT A POINT
         MOV     AL,1
         INT     10H
```

```
;
REJECT: POP     DX
        POP     CX
        POP     AX                      ; RESTORE REGISTOR
        RET                             ; AND LEAVE
;
SETPT   ENDP
;
; ROUTINE TO DRAW A LINE
;
SETLINE PROC    NEAR
;
        PUSH    BX                      ; SAVE REGISTERS
        PUSH    CX
        PUSH    DX
        PUSH    SI
        PUSH    DI
        PUSH    AX
;
; SET UP X AND Y UPDATES
;
        MOV     SI,1                    ; START WITH POSITIVE 1 FOR X UPDATE
        MOV     DI,1
;
; FIND !Y2-Y1!
;
        MOV     DX,Y2
        SUB     DX,Y1
        JGE     STOREY
        NEG     DI
        NEG     DX
STOREY:
        MOV     DELDY,DI
;
; FIND !X2-X1!
;
        MOV     CX,X2
        SUB     CX,X1
        JGE     STOREX
        NEG     SI
        NEG     CX
STOREX:
        MOV     DELDX,SI
;
; SORT !Y2-Y1! AND !X2-X1!
;
        CMP     CX,DX
        JGE     SETDIAG
        MOV     SI,0
        XCHG    CX,DX
        JMP     STOREDELSXY
;
SETDIAG:
        MOV     DI,0
; STORE DELS, DELP, DELSX,AND DELSY
STOREDELSXY:
        MOV     DELS,CX
        MOV     DELP,DX
        MOV     DELSX,SI
        MOV     DELSY,DI
;
; GET INITIAL VALUES FOR X AND Y
        MOV     SI,X1
        MOV     DI,Y1
```

```
;
; COMPUTE INITIAL VALUE AND INCREMENTS FOR ERROR FUNCTION.
;
        MOV     AX,DELP
        SAL     AX,1
        MOV     DELSE,AX
;
        SUB     AX,CX
        MOV     BX,AX
;
        SUB     AX,CX
        MOV     DELDE,AX
;
; ADJUST COUNT
;
        INC     CX
;
; MAIN LOOP STRUCTURE
;
LINELOOP:
        CALL    SETPT
        CMP     BX,0
        JGE     DIAGONAL
;
; CASE FOR STRAIGHT MOVE
;
STRAIGHT:
        ADD     SI,DELSX
        ADD     DI,DELSY
        ADD     BX,DELSE
        LOOP    LINELOOP
        JMP     LINEEXIT
;
; CASE FOR DIAGONAL MOVE
;
DIAGONAL:
        ADD     SI,DELDX
        ADD     DI,DELDY
        ADD     BX,DELDE
        LOOP    LINELOOP
;
LINEEXIT:
        POP     AX
        POP     DI
        POP     SI
        POP     DX
        POP     CX
        POP     BX
        RET
;
;
SETLINE ENDP
;
; ROUTINE TO DRAW A LINE FROM LAST POINT TO CURRENT POINT
;
DRAWTO  PROC    NEAR
;
;
        PUSH    AX
        MOV     AX,XL
        MOV     X1,AX                   ; LAST POINT
        MOV     AX,YL
        MOV     Y1,AX
        MOV     X2,SI                   ; CURRENT POINT
```

```
        MOV     Y2,DI
        MOV     X1,SI
        MOV     Y1,DI            ; UPDATE LAST POINT
        CALL    SETLINE
;
        POP     AX
        RET
;
DRAWTO  ENDP
;
CM1STP  PROC    NEAR
        PUSH    DX
        PUSH    AX
;
        MOV     DX,3FBH
        MOV     AL,80H
        OUT     DX,AL
;
        MOV     DX,3F8H
        MOV     AL,60H
        OUT     DX,AL
;
        MOV     DX,3F9H
        MOV     AL,00H
        OUT     DX,AL
;
        MOV     DX,3FBH
        MOV     AL,03H
        OUT     DX,AL
;
        MOV     DX,3FCH
        MOV     AL,03H
        OUT     DX,AL
;
        POP     AX
        POP     DX
        RET
CM1STP  ENDP
;
CM2STP  PROC    NEAR
        PUSH    DX
        PUSH    AX
;
        MOV     DX,2FBH
        MOV     AL,80H
        OUT     DX,AL
;
        MOV     DX,2F8H
        MOV     AL,0CH
        OUT     DX,AL
;
        MOV     DX,2F9H
        MOV     AL,00H
        OUT     DX,AL
;
        MOV     DX,2FBH
        MOV     AL,03H
        OUT     DX,AL
;
        POP     AX
        POP     DX
        RET
CM2STP  ENDP
```

```
;
CM1COM    PROC      NEAR
;
          PUSH      AX
;
          MOV       AL,27
          CALL      CM1OUT
          POP       AX
          CALL      CM1OUT
;
          RET
;
CM1COM    ENDP
;
PP1OUT    PROC      NEAR
;
          PUSH      DX
;
          MOV       DX,0378H
          OUT       DX,AL
;
          POP       DX
          RET
;
PP1OUT    ENDP
;
CM1OUT    PROC      NEAR
          PUSH      DX
          PUSH      AX
          MOV       DX,3FDH
LP2:      IN        AL,DX
          AND       AL,20H
          JE        LP2
;
          MOV       DX,3F8H
          POP       AX
          OUT       DX,AL
          POP       DX
          RET
;
CM1OUT    ENDP
;
CM1IN     PROC      NEAR
          PUSH      DX
;
          MOV       DX,3FDH
LP3:      IN        AL,DX
          AND       AL,1H
          JE        LP3
;
          MOV       DX,3F8H
          IN        AL,DX
          POP       DX
          RET
;
CM1IN     ENDP
;
CM2OUT    PROC      NEAR
          PUSH      DX
          PUSH      AX
          MOV       DX,2FDH
LP4:      IN        AL,DX
          AND       AL,20H
```

```
            JE      LP4
;
            MOV     DX,2F8H
            POP     AX
            OUT     DX,AL
            POP     DX
            RET
;
CM2OUT      ENDP
;
CM2IN       PROC    NEAR
            PUSH    DX
;
            MOV     DX,2FDH
LP5:        IN      AL,DX
            AND     AL,1H
            JE      LP5
;
            MOV     DX,2F8H
            IN      AL,DX
            POP     DX
            RET
;
CM2IN       ENDP
;
VOUT        PROC    NEAR
            PUSH    DX
            PUSH    AX
;
            MOV     DL,AL
            MOV     AH,02H
            INT     21H
;
            POP     AX
            POP     DX
            RET
;
VOUT        ENDP
;
; ROUTINE TO INITIALZE SUMMA-SKETCH
;
PADINZ      PROC    NEAR
;
            PUSH    AX
            PUSH    DX
;
            MOV     AL,0            ; RESET PAD
            CALL    CM2OUT
;
            MOV     AL,44H          ; REMOTE REQUEST MODE
            CALL    CM2OUT
;
            MOV     AL,49H          ; INCREMENT COMMAND
            CALL    CM2OUT
;
            MOV     AL,21H          ; INCREMENT VALUE 1
            CALL    CM2OUT
;
            MOV     AL,62H          ; SET ORIGIN
            CALL    CM2OUT
;
            MOV     AL,64H          ; RESOLUTION : 100 lpi
            CALL    CM2OUT
;
;           MOV     AL,45H          ; DELTA MODE
;           CALL    CM2OUT
```

```
;
        MOV     DX,2F8H         ; CLEAR PAD OUTPUT BUFFER
        IN      AL,DX
;
        POP     DX
        POP     AX
        RET
;
PADINZ  ENDP
;
PADGO   PROC    NEAR
;
        PUSH    AX
;
        MOV     AL,11H          ; START TRANSMISSION
        CALL    CM2OUT
;
        POP     AX
        RET
;
PADGO   ENDP
;
PADHOLD PROC    NEAR
;
        PUSH    AX
;
        MOV     AL,13H          ; STANDBY
        CALL    CM2OUT
;
        POP     AX
        RET
;
PADHOLD ENDP
;
; ROUTINE TO GET POINT FROM THE PAD
;
GETPT   PROC    NEAR
;
        PUSH    AX
        PUSH    DX
;
        MOV     AL,50H          ; TRIGGER COMMAND
        CALL    CM2OUT
;
;
PASS:   CALL    CM2IN           ; CHECH BIT 7 FOR PHASING
        TEST    AL,80H
        JE      PASS
        MOV     BUTTON,AL
;
        CALL    CM2IN           ; PUT LOW BYTE OF X IN DH
        MOV     DH,AL
        MOV     DL,0
;
        CALL    CM2IN           ; GET HIGH BYTE OF X
        MOV     AH,0            ; PUT IT IN AX
;
        SHL     DX,1            ; CONCATINATE
        SHL     DX,1            ;   DUMP 1ST BIT
        RCL     AX,1            ;   ATTACH 2ND BIT THROUGH CF
        SHL     DX,1            ;   ATTACJ 3RD BIT THROUGH CF
        RCL     AX,1
        SHL     DX,1            ;   ATTACH 4TH AND 5TH BIT
```

```
              RCL     AX,1
              SHL     DX,1
              RCL     AX,1
              MOV     SI,AX
;
              CALL    CM2IN           ; PUT LOW BYTE OF Y IN DH
              MOV     DH,AL
              MOV     DL,0
;
              CALL    CM2IN           ; GET HIGH BYTE OF Y
              MOV     AH,0
;
              SHL     DX,1            ; SAME AS X EXCEPT ONLY ATTACH ONE BIT
              SHL     DX,1
              RCL     AX,1
              SHL     DX,1            ; ATTACH ONE MORE POINT
              RCL     AX,1
              MOV     DI,AX
              NOT     DI
              AND     DI,01FFH
              SUB     DI,70
;
;
;
              POP     DX
              POP     AX
              RET
;
GETPT         ENDP
;
; ROUTINE TO CONVERT FROM INTERNAL 16-BIT BINARY TO ASCII DECIMAL
;
DEC16OUT      PROC    NEAR
;
              PUSH    DS
              PUSH    DI
              PUSH    DX
              PUSH    CX
              PUSH    AX
;
              MOV     AX,DATA
              MOV     DS,AX
;
; NUMBER IS IN DX
;
; INPUT THE DIGITS IN A BUFFER
;
              MOV     CX,0
              LEA     DI,TBUFF
DEC16OUT1:
              PUSH    CX
              MOV     AX,DX
              MOV     DX,0
              MOV     CX,10
              DIV     CX
              XCHG    AX,DX
;
              ADD     AL,30H
              MOV     [DI],AL
              INC     DI
;
              POP     CX
              INC     CX
              CMP     DX,0
              JNZ     DEC16OUT1
```

```
;
; DUMP THE BUFFER OUT
;
DEC16OUT2:
        DEC     DI
        MOV     AL,[DI]
        CALL    VOUT
        LOOP    DEC16OUT2
;
        POP     AX
        POP     CX
        POP     DX
        POP     DI
        POP     DS
        RET
;
DEC16OUT        ENDP
;
; ROUTINE TO GET A POINT FROM SUMMA-SKETCH
; WHILE IT IS OPERATING IN DELTA MODE
;
;
INZ     PROC    NEAR
        CALL    CLS
        CALL    CM1STP
        CALL    CM2STP
        CALL    PADINZ
        CALL    PADHOLD
        CALL    VCRINZ
;
        RET
INZ     ENDP
;
VCRINZ  PROC    NEAR
;
        PUSH    AX
;
        MOV     AL,01H
        MOV     DX,0379H
        OUT     DX,AL
;
        MOV     AL,030H
        MOV     DX,0378H
        OUT     DX,AL
;
        POP     AX
;
        RET
;
VCRINZ  ENDP
;
OUTPT   PROC    NEAR
;
        PUSH    AX
        PUSH    DX
;
        MOV     DX,SI
        SHL     DL,1
        RCL     DH,1
        SHL     DL,1
        RCL     DH,1

TEST    BUTTON,1
        JE      NOTPUSH
```

```
                AND     DH,03FH
                OR      DH,040H
                MOV     AL,DH
                CALL    CM1OUT
                JMP     LOWBYTE
        ;
        NOTPUSH:
                AND     DH,03FH
                OR      DH,080H
                MOV     AL,DH
                CALL    CM1OUT
        ;
        LOWBYTE:
                SHR     DL,1
                SHR     DL,1
                OR      DL,0C0H
        ;
                MOV     AL,DL
                CALL    CM1OUT
        ;
                MOV     DX,DI
                SHL     DL,1
                RCL     DH,1
                SHL     DL,1
                RCL     DH,1
        ;
                OR      DH,0C0H
                MOV     AL,DH
                CALL    CM1OUT
        ;
                SHR     DL,1
                SHR     DL,1
                OR      DL,0C0H
                MOV     AL,DL
                CALL    CM1OUT
        ;
                POP     DX
                POP     AX
        ;
                RET
        ;
        OUTPT   ENDP
        ;
        ;
        MAIN    ENDP
        ;
        CODE    ENDS
        ;
                END     MAIN
```

3675-010                              APPENDIX B

Slave Video-Display Control Program

```
type rvip.asm
;
;       THIS IS THE MAIN PROGRAM
;       TO CONTROL ONE VCR
;
STACK   SEGMENT PARA STACK 'STACK'
        DB 256 DUP (0)
STACK   ENDS
;
EXTRA   SEGMENT PARA PUBLIC 'EXTRA'
```

```
EXTRA     ENDS
;
DATA      SEGMENT PARA PUBLIC 'DATA'
;
;
; BUFFERS FOR SIMPLE INPUT/OUTPUT :
; -------  ---  ------  -----------
;
INBUF     DB 1 DUP (0)              ; BUFFER FOR INPUT COMMAND
BUTTON    DB 1 DUP (0)
;
; LOOK UP TABLE :
; ----  --  -----
;
TABLE     DW           59
          DW           PLAY
          DW           60
          DW           STOP
          DW           61
          DW           FORWARD
          DW           62
          DW           REWIND
          DW           63
          DW           HOLD
          DW           64
          DW           SCREEN
          DW           65
          DW           DRAW
          DW           66
          DW           BYE
;
; COORDINATE FOR DRAW LINE ROUTINE :
; ----------  ---  ----  ----  -------
;
X1        DW           0
X2        DW           0
Y1        DW           0
Y2        DW           0
DELDY     DW           0
DELDX     DW           0
DELS      DW           0
DELP      DW           0
DELSX     DW           0
DELSY     DW           0
DELSE     DW           0
DELDE     DW           0
;
; DATA FOR DRAW TO ROUTINE :
; ----  ---  ----  --  -------
;
XL        DW           0
YL        DW           0
;
; DATA BUFFER FOR CONVERSIONS
;
TBUFF     DB           20 DUP (0)
;
; END SESSION FLAG FOR PROCEDURE BYE
;
ENDFLAG   DB           1 DUP (0)
;
DATA      ENDS
;
```

```
;
CODE    SEGMENT PARA PUBLIC 'CODE'
;
MAIN    PROC    FAR
;
;
; INITIALIZE
; OPEN FILE AND GET FILE HANDLES
; -------------------------------
;
        ASSUME  CS:CODE         ; INITIALIZE PSP
        PUSH    DS              ; (PROGRAM SEGMENT PREFIX)
        MOV     AX,0
        PUSH    AX
        MOV     AX,DATA
        MOV     DS,AX
        ASSUME  DS:DATA
        MOV     AX,0B800H
        MOV     ES,AX
        ASSUME  ES:EXTRA
;
;
        CALL    INZ
;
; CLEAR THE KEYBOARD BUFFER AND
; GET A COMMAND FROM KEYBOARD
; -------------------------------
;
START:  CALL    INCOM           ; CALL PROCEDURE INPUT-COMMAND
;
;
; BRANCH TO APPROPRIATE
; COMMAND SUBROUTINE
; -------------------------
;
        CALL    BRANCH          ; CALL PROCEDURE BRANCHING
;
; JUMP BACK TO GET ANOTHER COMMAND
; --------------------------------
;
        CMP     ENDFLAG,0
        JE      START           ; JUMP TO START
        RET
;

;
;       ROUTINE TO PLAY THE VCR
;
PLAY    PROC    NEAR
;
        PUSH    AX              ; SAVE REGISTORS
;
        MOV     AL,01H          ; TURN ON PLAY
        CALL    PP1OUT
;
        MOV     AL,0            ; TURN LED OFF
        CALL    PP1OUT
;
        POP     AX
        RET
;
PLAY    ENDP
;
;       ROUTINE TO STOP BOTH REMOTE AND LOCAL VCRS
```

```
;
STOP    PROC    NEAR
;
        PUSH    AX              ; SAVE REGISTORS
;
        MOV     AL,10H
        CALL    PP1OUT
;
        MOV     AL,0
        CALL    PP1OUT
;
        POP     AX
        RET
;
STOP    ENDP
;
;       ROUTINE TO DO FAST FORWARD AND FORWARD SCAN
;
FORWARD PROC    NEAR
;
        PUSH    AX              ; SAVE REGISTORS
;
;
        MOV     AL,02H
        CALL    PP1OUT
;
        POP     AX
        RET
;
FORWARD ENDP

;
;       ROUTINE TO DO FAST REWIND AND BACKWARD SCAN
;
REWIND  PROC    NEAR
;
        PUSH    AX              ; SAVE REGISTORS
;
        MOV     AL,04H
        CALL    PP1OUT
;
        POP     AX
        RET
;
REWIND  ENDP
;
;       ROUTINE TO PAUSE (HOLDING)
;       BOTH REMOTE AND LOCAL VCRS
;
HOLD    PROC    NEAR
;
        PUSH    AX              ; SAVE REGISTORS
;
        MOV     AL,08H
        CALL    PP1OUT
;
        MOV     AL,0
        CALL    PP1OUT
;
        POP     AX
        RET
;
HOLD    ENDP
;
```

```
;
; ROUTINT TO SWITCH SCREEN
;
SCREEN  PROC    NEAR
;
        PUSH    AX                      ; SAVE REGISTORS
;
        MOV     AL,30H
        CALL    PP1OUT
;
        POP     AX
        RET
;
SCREEN  ENDP
;
; ROUTINE TO END SESSION
;
BYE     PROC    NEAR
;
        MOV     AH,0                    ; SET DISPLAY TO 320x200 COLOR
        MOV     AL,1
        INT     10H
;
        MOV     AL,030H
        CALL    PP1OUT
;
        MOV     ENDFLAG,0FFH
        RET
;
BYE     ENDP
;

;
;
; ROUTINE TO USE ELECTRIC CHALK BOARD
; ( THE DRAWING ROUTINE )
;
;
DRAW    PROC    NEAR
;
        PUSH    AX                      ; SAVE RESTORES
        PUSH    BX
        PUSH    CX
        PUSH    DX
;
        MOV     AH,0                    ; INITIALIZE GRAPHIC SCREEN
        MOV     AL,6                    ;   640x200 BLACK AND WHITE
        INT     10H
;
        CALL    SCREEN                  ; SWITCH DISPLAY FROM VCR TO COMPUTER
;
PTA:    MOV     AX,0B800H               ; POINT A(ZERO)
        MOV     ES,AX
        CALL    CLS
;                                       ; COME TO HERE AFTER PLOT POINT
;
        CALL    CM1IN
        MOV     AH,AL
        AND     AH,0C0H
        JE      DECIDE
PTB:    CALL    CM1IN                   ; CALL THIS POINT B (ONE)
        MOV     AH,AL
        AND     AH,0C0H
        JE      DECIDE
;
```

```
            CMP     AH,0C0H
            JE      PTB
    ;
            CALL    GETPT
            TEST    BUTTON,1
            JE      PTB
    ;
            MOV     XL,SI
            MOV     YL,DI
    ;
    PTBX:   CALL    CM1IN
            MOV     AH,AL
            AND     AH,0C0H
            JE      DECIDE
    ;
            CMP     AH,0C0H
            JE      PTBX
    ;
            CALL    GETPT
            TEST    BUTTON,1
            JE      PTB
    ;
            CALL    DRAWTO
            JMP     PTBX
    ;
    ;
    DECIDE: CALL    CM1IN                   ; EXECUTE COMMAND FROM KEYBOARD
            CMP     AL,66                   ; IF EXIT
            JE      DONE            ; JUMP OUT
    ;
            CMP     AL,67                   ; IF CLEAR-SCREEN
            JE      PTA                     ; JUMP TO BEGINNING OF ROUTINE
    ;
            JMP     PTB
    ;                                       ; JUMP TO POINT 1 TO PLOT ANOTHER POINT
    DONE:   MOV     AL,0                    ; CLEAR DRAW FLAG
            CALL    PP1OUT
    ;
            POP     DX                      ; RESTORE REGISTORS
            POP     CX
            POP     BX
            POP     AX
            RET
    ;
    DRAW    ENDP
    ;
    ;
    ; ROUTINE INPUT-COMMAND TO
    ; CLEAR THE KEYBOARD BUFFER
    ; AND TAKE A KEY FROM THE
    ; KEYBOARD
    ;
    ;
    INCOM   PROC    NEAR
    ;
            PUSH    AX                      ; SAVE REGISTOR
    ;
    NOTFRONT:
            CALL    CM1IN
            CMP     AL,27
            JNE     NOTFRONT
    ;
            CALL    CM1IN
            MOV     INBUF,AL
    ;
            POP     AX                      ; RESTORE REGISTOR
            RET
    ;
    INCOM   ENDP
```

```
;
;
;
; ROUTINE TO BRANCH TO THE APPROPRIATE ROUTINE
; (CONTROLLING THE VCR)
;
BRANCH  PROC    NEAR
;
        PUSH    AX
        PUSH    BX
        PUSH    CX
        PUSH    DX
;
        MOV     CX,8              ; TOTAL NUMBER OF COMMANDS AVAILABLE
        MOV     BX,0
        MOV     AH,0
        MOV     AL,INBUF
AGAIN:  CMP     AX,TABLE[BX]      ; LOOK UP COMMAND FROM KEYBOARD
        JE      FOUND             ; JUMP OUT IF FOUND
        INC     BX
        INC     BX
        INC     BX
        INC     BX
        LOOP    AGAIN             ; LEAVE IF NO SUCH COMMAND

POP     DX
        POP     CX
        POP     BX
        POP     AX
        RET
;
FOUND:  INC     BX                ; CALL THE SUBROUTINE
        INC     BX
        CALL    TABLE[BX]

POP     DX                ; RESTORE REGISTORES AND LEAVE
        POP     CX
        POP     BX
        POP     AX
        RET
;
BRANCH  ENDP
;

;       ROUTINE TO CLEAR SCREEN
;
;
CLS     PROC    NEAR
        PUSH    CX
        PUSH    AX
;
        MOV     CX,2000H
        MOV     AX,0
        MOV     DI,AX
        CLD
;
        REP     STOSW
;
        POP     AX
        POP     CX
;
        RET
;
CLS     ENDP
;
```

```
; ROUTINE TO PLOT A POINT ON THE 640x200
; BLACK AND WHITE HIGH RESOLUTION SCREEN
;         -UPON ENTRY :
;                                 SI: X-COORDINATE
;                                 DI: Y-COORDINATE
;
SETPT   PROC    NEAR
;
        PUSH    AX                      ; SAVE REGISTOR
        PUSH    CX
        PUSH    DX
;
        MOV     CX,SI
        MOV     DX,DI
        MOV     AH,12                   ; PLOT A POINT
        MOV     AL,1
        INT     10H
;
        POP     DX
        POP     CX
        POP     AX                      ; RESTORE REGISTOR
        RET                             ; AND LEAVE
;
SETPT   ENDP
;
; ROUTINE TO DRAW A LINE
;
SETLINE PROC    NEAR
;
        PUSH    BX                      ; SAVE REGISTERS
        PUSH    CX
        PUSH    DX
        PUSH    SI
        PUSH    DI
        PUSH    AX
;
; SET UP X AND Y UPDATES
;
        MOV     SI,1                    ; START WITH POSITIVE 1 FOR X UPDATE
        MOV     DI,1
;
; FIND |Y2-Y1|
;
        MOV     DX,Y2
        SUB     DX,Y1
        JGE     STOREY
        NEG     DI
        NEG     DX
STOREY:
        MOV     DELDY,DI
;
; FIND |X2-X1|
;
        MOV     CX,X2
        SUB     CX,X1
        JGE     STOREX
        NEG     SI
        NEG     CX
STOREX:
        MOV     DELDX,SI
;
; SORT |Y2-Y1| AND |X2-X1|
;
```

```
            CMP     CX,DX
            JGE     SETDIAG
            MOV     SI,0
            XCHG    CX,DX
            JMP     STOREDELSXY
;
SETDIAG:
            MOV     DI,0
; STORE DELS, DELP, DELSX, AND DELSY
STOREDELSXY:
            MOV     DELS,CX
            MOV     DELP,DX
            MOV     DELSX,SI
            MOV     DELSY,DI
;
; GET INITIAL VALUES FOR X AND Y
            MOV     SI,X1
            MOV     DI,Y1
;
; COMPUTE INITIAL VALUE AND INCREMENTS FOR ERROR FUNCTION
;
            MOV     AX,DELP
            SAL     AX,1
            MOV     DELSE,AX
;
            SUB     AX,CX
            MOV     BX,AX
;
            SUB     AX,CX
            MOV     DELDE,AX
;
; ADJUST COUNT
;
            INC     CX
;
; MAIN LOOP STRUCTURE
;
LINELOOP:
            CALL    SETPT
            CMP     BX,0
            JGE     DIAGONAL
;
; CASE FOR STRAIGHT MOVE
;
STRAIGHT:
            ADD     SI,DELSX
            ADD     DI,DELSY
            ADD     BX,DELSE
            LOOP    LINELOOP
            JMP     LINEEXIT
;
; CASE FOR DIAGONAL MOVE
;
DIAGONAL:
            ADD     SI,DELDX
            ADD     DI,DELDY
            ADD     BX,DELDE
            LOOP    LINELOOP
;
LINEEXIT:
            POP     AX
            POP     DI
            POP     SI
```

```
                POP     DX
                POP     CX
                POP     BX
                RET
;
;
SETLINE ENDP
;
; ROUTINE TO DRAW A LINE FROM LAST POINT TO CURRENT POINT
;
DRAWTO  PROC    NEAR
;
;
                PUSH    AX
;
                CMP     SI,640
                JNC     BPT
                CMP     SI,0
                JC      BPT
                CMP     DI,440
                JNC     BPT
                CMP     DI,240
                JC      BPT
;
                MOV     AX,XL
                MOV     X1,AX            ; LAST POINT
                MOV     AX,YL
                MOV     Y1,AX
                MOV     X2,SI            ; CURRENT POINT
                MOV     Y2,DI
                CALL    SETLINE
BPT:            MOV     XL,SI
                MOV     YL,DI            ; UPDATE LAST POINT
;
                POP     AX
                RET
;
DRAWTO  ENDP
;
CM1STP  PROC    NEAR
                PUSH    DX
                PUSH    AX
;
                MOV     DX,3FBH
                MOV     AL,80H
                OUT     DX,AL
;
                MOV     DX,3FBH
                MOV     AL,60H
                OUT     DX,AL
;
                MOV     DX,3F9H
                MOV     AL,00H
                OUT     DX,AL
;
                MOV     DX,3FBH
                MOV     AL,03H
                OUT     DX,AL
;
                MOV     DX,3FCH
                MOV     AL,01H
                OUT     DX,AL
;
```

```
                POP     AX
                POP     DX
                RET
CM1STP  ENDP
;
CM2STP  PROC    NEAR
                PUSH    DX
                PUSH    AX
;
                MOV     DX,2FBH
                MOV     AL,80H
                OUT     DX,AL
;
                MOV     DX,2F8H
                MOV     AL,0CH
                OUT     DX,AL
;
                MOV     DX,2F9H
                MOV     AL,00H
                OUT     DX,AL
;
                MOV     DX,2FBH
                MOV     AL,03H
                OUT     DX,AL
;
                POP     AX
                POP     DX
                RET
CM2STP  ENDP
;
CM1COM  PROC    NEAR
;
                PUSH    AX
                PUSH    DI
;
                MOV     DI,DX
FRONT:          MOV     AL,[DI]
                CALL    CM1OUT
                INC     DI
                LOOP    FRONT
;
                POP     DI
                POP     AX
                RET
;
CM1COM  ENDP
;
PP1OUT  PROC    NEAR
;
                PUSH    DX
;
                MOV     DX,037CH
                OUT     DX,AL
;
                POP     DX
                RET
;
PP1OUT  ENDP
;
CM1OUT  PROC    NEAR
                PUSH    DX
                PUSH    AX
                MOV     DX,3FDH
```

```
LP2:      IN      AL,DX
          AND     AL,20H
          JE      LP2
;
          MOV     DX,3F8H
          POP     AX
          OUT     DX,AL
          POP     DX
          RET
;
CM1OUT    ENDP
;
CM1IN     PROC    NEAR
          PUSH    DX
;
          MOV     DX,3FDH
LP3:      IN      AL,DX
          AND     AL,1H
          JE      LP3
;
          MOV     DX,3F8H
          IN      AL,DX
          POP     DX
          RET
;
CM1IN     ENDP
;
CM2OUT    PROC    NEAR
          PUSH    DX
          PUSH    AX
          MOV     DX,2FDH
LP4:      IN      AL,DX
          AND     AL,20H
          JE      LP4
;
          MOV     DX,2F8H
          POP     AX
          OUT     DX,AL
          POP     DX
          RET
;
CM2OUT    ENDP
;
CM2IN     PROC    NEAR
          PUSH    DX
;
          MOV     DX,2FDH
LP5:      IN      AL,DX
          AND     AL,1H
          JE      LP5
;
          MOV     DX,2F8H
          IN      AL,DX
          POP     DX
          RET
;
CM2IN     ENDP
;
VOUT      PROC    NEAR
          PUSH    DX
          PUSH    AX
;
```

```
              MOV      DL,AL
              MOV      AH,02H
              INT      21H
;
              POP      AX
              POP      DX
              RET
;
VOUT   ENDP
;
; ROUTINE TO GET POINT FROM THE PAD
;
GETPT  PROC     NEAR
;
              PUSH     AX
;
              MOV      AH,AL
              MOV      BUTTON,0
              TEST     AH,040H
              JE       NOTPUSH
;
              ADD      BUTTON,1
NOTPUSH:
              CALL     CM1IN
              SHL      AL,1
              SHL      AL,1
              AND      AH,03FH
              SHR      AH,1
              RCR      AL,1
              SHR      AH,1
              RCR      AL,1
              MOV      SI,AX
;
              CALL     CM1IN
              MOV      AH,AL
              CALL     CM1IN
              SHL      AL,1
              SHL      AL,1
              AND      AH,03FH
              SHR      AH,1
              RCR      AL,1
              SHR      AH,1
              RCR      AL,1
              MOV      DI,AX
;
              POP      AX
              RET
;
GETPT  ENDP
;
; ROUTINE TO CONVERT FROM INTERNAL 16-BIT BINARY TO ASCII DECIMAL
;
DEC16OUT       PROC    NEAR
;
              PUSH     DS
              PUSH     DI
              PUSH     DX
              PUSH     CX
              PUSH     AX
;
              MOV      AX,DATA
              MOV      DS,AX
;
; NUMBER IS IN DX
```

```
;
; INPUT THE DIGITS IN A BUFFER
;
        MOV     CX,0
        LEA     DI,TBUFF
DEC16OUT1:
        PUSH    CX
        MOV     AX,DX
        MOV     DX,0
        MOV     CX,10
        DIV     CX
        XCHG    AX,DX
;
        ADD     AL,30H
        MOV     [DI],AL
        INC     DI
;
        POP     CX
        INC     CX
        CMP     DX,0
        JNZ     DEC16OUT1
;
; DUMP THE BUFFER OUT
;
DEC16OUT2:
        DEC     DI
        MOV     AL,[DI]
        CALL    VOUT
        LOOP    DEC16OUT2
;
        POP     AX
        POP     CX
        POP     DX
        POP     DI
        POP     DS
        RET
;
DEC16OUT        ENDP
;
INZ     PROC    NEAR
        CALL    CLS
        CALL    CM1STP
        CALL    VCRINZ
;
        RET
INZ     ENDP
;
VCRINZ  PROC    NEAR
;
        PUSH    AX
;
        MOV     AL,0H
        MOV     DX,0379H
        OUT     DX,AL
;
        MOV     AL,030H
        MOV     DX,0378H
        OUT     DX,AL
;
        POP     AX
        RET
;
```

```
VCRINZ    ENDP
;
;
;
MAIN      ENDP
;
CODE      ENDS
;
          END       MAIN
```

I claim:

1. A remote teaching system, comprising:
   (a) a plurality of student stations, each student station including:
   - (a.1) a voice telephone set connectable to a telephone system for voice communication;
   - (a.2) a video display monitor for displaying visual images;
   - (a.3) a video media player connected to the video display monitor for playing video media to produce visual images on the display monitor, the video media player having a start/stop-control-signal input port and being adapted to start and stop the playing of video media in response to start/stop-control signals applied to the start/stop-control-signal input port; and
   - (a.4) video-media-player control means connectable to the telephone system and connected to the start/stop-control-signal input port of the video media player for receiving telephonic start/stop control signals over the telephone system and transmitting corresponding start/stop control signals to the start/stop-control-signal input port of the video media player to controllably start and stop the playing of video media in the video media player; and (b) a teacher station including:
   - (b.1) a voice telephone set connectable to the telephoee system for voice communication between the teacher station and the student stations;
   - (b.2) a video display monitor for displaying visual images;
   - (b.3) a video media player connected to the video display monitor for playing video media to produce visual images on the display monitor, the video media player having a start/stop-control-signal input port and being adapted to start and stop the playing of video media in response to start/stop control signals applied to the start/stop-control-signal input port; and
   - (b.4) video-media-player master control means connectable to the telephone system and connected to the start/stop-control-signal input port of the video media player of the teacher station for generating start/stop control signals in response to instructions from an operator of the teacher station, for applying the start/stop control signals to the start/stop-control-signal input port of the video media player of the teacher station and for transmitting corresponding telephonic start/stop control signals over the telephone system so that the playing of video media players of the teacher station and of the student stations can be started and stopped substantially in synchronism.

2. The remote teaching system according to claim 1 in which each video-media-player control means comprises:
   - (a.4.1) a digital computer having random-access memory for storing data and programs, a central processing unit in communication with the random-access memory for executing programs stored in the memory, a keyboard in communication with the random-access memory for entering data and programs into the memory, and an input/output channel, the input/output channel being connected to the start/stop-control-signal input port of the video media player; and
   - (a.4.2) a modem connected to the input/output channel of the digital computer, the modem being connectable to the telephone system for receiving telephonic start/stop control signals over the telephone system and transmitting corresponding control signals to the input/output channel of the digital computer, the digital computer being capable of transmitting start/stop control signals from the input/output channel to the start/stop-control-signal input port of the video media player in response to the control signals from the modem; and in which the video-media-player master control means comprises:
   - (b.4.1) a digital computer having random-access memory for storing data and programs, a central processing unit in communication with the random-access memory for executing programs stored in the memory, a keyboard in communication with the random-access memory for entering data and programs into the memory, and an input/output channel, the input/output channel being connected to the start/stop-control-signal input port of the video media player; and
   - (b.4.2) a modem connected to the input/output channel of the digital computer, the modem being connectable to the telephone system for receiving start/stop control signals from the input/output channel of the digital computer and transmitting corresponding telephonic control signals over the telephone system.

3. The remote teaching system according to claim 2 in which the input/output channel of each digital computer includes a computer video-signal output port, each input/output channel being capable of generating a computer video signal at the computer video-signal output port for driving a video display monitor; each student station further including:
   - (a.5) an electrically-controlled double-throw video-signal switch having a computer video-signal input port, a video-media-player video-signal input port, a display-monitor video-signal output port, and a switch-control-signal input port, the video-signal switch being adapted to connect the display-monitor video-signal output port to either the computer video-signal input port or the video-media-player video-signal input port in response to a video-signal-selection control signal applied to the switch-control-signal input port, the computer video-signal input port being connected to the computer video-signal output port of the digital computer, the video-media-player video signal input port being connected to a video-signal output port of the video media player, the display-monitor video-signal output port being connected to a video-signal input port of the video display monitor, and the switch-control-signal input port being connected to the input/output channel of the digital computer; and the teacher station further including:

(b.5) an electrically-controlled double-throw video-signal switch having a computer video-signal input port, a video-media-player video-signal input port, a display-monitor video-signal output port, and a switch-control-signal input port, the video-signal switch being adapted to connect the display-monitor video-signal output port to either the computer video-signal input port or the video-media-player video-signal input port in response to a video-signal-selection control signal applied to the switch-control-signal input port, the computer video-signal input port being connected to the computer video-signal output port of the digital computer, the video-media-player video signal input port being connected to a video-signal output port of the video media player, the display-monitor video-signal output port being connected to a video-signal input port of the video display monitor, and the switch-control-signal input port being connected to the input/output channel of the digital computer.

4. The remote teaching system according to claim 3 in which the video media player of each station is a video-tape cassette player.

5. The remote teaching system according to claim 3 in which the video media player of each station is a video disk player.

6. The remote teaching system according to claim 3 in which the modem of each station is an integrated voice/data modem having a data-channel port, a voice-channel port, and a telephone-line connection port, the data channel port being connected to the input/output channel of the digital computer associated with the station, the voice-channel port being connected to the voice telephone set associated with the station, and the telephone-line connection port being connectable to the telephone system.

7. The remote teaching system according to claim 1 in which the voice telephone set of each station is a speaker telephone.

8. The remote teaching station according to claim 2 in which the teacher station further includes:

(b.5) graphics input means connected to the input/output channel of the digital computer of the video-media-player master control means of the teacher station for entering digitally encoded graphics images into the digital computer.

9. The remote teaching station according to claim 8 in which the graphics input means includes a digital graphics tablet.

10. A remote teaching system, comprising:
(a) a teacher station including:
(a.1) a digital computer having random-access memory for storing data and programs, a central processing unit in communication with the random-access memory for executing programs stored in the memory, a keyboard in communication with the random-access memory for entering data and programs into the memory, and an input/output channel, the input/output channel including a computer video-signal output port and a digital-signal output port, the input/output channel being adapted to generate at the computer video-signal output port a computer video signal for driving a video display monitor and to generate digital signals at the digital-signal output port in response to output commands from the central processing unit;
(a.2) a video display monitor having a video-display-monitor video-signal input port, the video display monitor being adapted to display visual images in response to video signals applied to the video-signal input port;
(a.3) a video-tape cassette player having a video-player video-signal output port and a video-player control-signal input port, the video-tape cassette player being adapted to play a video-tape cassette mounted in the player in response to video-player operation control signals applied to the video-player control-signal input port, the video signal obtained from the video tape cassette being produced at the video-player video-signal output port;
(a.4) an electrically-controlled double-throw video-signal switch having a computer video-signal input port, a video-player video-signal input port, a display-monitor video-sinal output port, and a switch-control-signal input port, the electrically-controlled double-throw video-signal switch being adapted to connect the display monitor video-signal output port to one of the computer video-signal input port or the video-player videosignal input port in response to a video-signalselection control signal applied to the switch-control-signal input port;
(a.5) video-signal transmission means connecting respectively (i) the video-player video-signal output port of the video-tape cassette player to the video-player video-signal input port of the video-signal switch, (ii) the computer video-signal output port of the digital computer to the computer video-signal input port of the video-signal switch, and (iii) the display-monitor video-signal output port of the video-signal switch to the video-display-monitor video-signal input port of the video display monitor;
(a.6) video-player control-signal transmission means for connecting the digital signal output port of the input/output channel of the digital computer to the video-player control-signal input port of the video-tape cassette player so that video-player operation control signals produced at the digital-signal output port of the digital computer can controllably start and stop the playing of a video-tape cassette in the video cassette player;
(a.7) a speaker telephone connectable to a telephone system for voice communication;
(a.8) a modem having a data-channel port and a telephone line connection port for transmitting and receiving telephonic data signals over a telephone system; and (a.9) digital-signal transmission means interconnecting the input/output channel of the digital computer and the data-channel port of the modem; and (b) a plurality of student stations, each student station being connectable to the telephone system, each student station including:

(b.1) a digital computer having random-access memory for storing data and programs, a central processing unit in communication with the random-access memory for executing programs stored in the memory, a keyboard in communication with the random-access memory for entering data and programs into the memory, and an input/output channel, the input/output channel including a computer video-signal output port and a digital-signal output port, the input/output channel being adapted to generate at the computer video-signal output port a computer video signal for driving a video display monitor and to generate digital signals at the digital-signal output port in response to output commands from the central processing unit;

(b.2) a video display monitor having a video-display-monitor video-signal input port, the video display monitor being adapted to display visual images in response to video signals applied to the video-signal input port;

(b.3) a video-tape cassette player having a video-player video-signal output port and a video-player control-signal input port, the video-tape cassette player being adapted to play a video tape cassette mounted in the player in response to video-player operation control signals applied to the video-player control-signal input port, the video signal obtained from the video tape cassette being produced at the video-player video-signal output port;

(b.4) an electrically-controlled double-throw video-signal switch having a computer video-signal input port, a video-player video-signal input port, a display monitor video-signal output port, and a switch-control-signal input port, the electrically-controlled double-throw video-signal switch being adapted to connect the display monitor video-signal output port to one of the computer video-signal input port or the video-player videosignal input port in response to a video-signalselection control signal applied to the switch-control-signal input port;

(b.5) video-signal transmission means connecting respectively (i) the video-player video-signal output port of the video-tape cassette player to the video-player video-signal input port of the video-signal switch, (ii) the computer video-signal output port of the digital computer to the computer video-signal input port of the video-signal switch, and (iii) the display-monitor video-signal output port of the video-signal switch to the video-display-monitor video-signal input port of the video display monitor;

(b.6) video-player control-signal transmission means for interconnecting the digital signal output port of the input/output channel of the digital computer and the video-player control-signal input port of the video-tape cassette player so that video-player operation control signals produced at the digital-signal output port of the digital computer can controllably start and stop the playing of a video tape cassette in the video-tape cassette player;

(b.7) a speaker telephone connectable to the telephone system for voice communication with the teaching station and with other student stations;

(b.8) a modem having a data channel port and a telephone-line connection port for transmitting and receiving telephonic data signals over on the telephone system; and (b.9) digital-signal transmission means connecting the input/output channel of the digital computer to the data-channel port of the modem.

11. The remote teaching system according to claim in which each video-tape cassette player is adapted to perform the functions of start, stop, fast forward, reverse and pause to display a single image frame in response to video-player operation control signals applied to the video-player control-signal input port.

12. A remote teaching system, comprising:

(a) a teacher station including (a.1) a digital computer having random-access memory for storing data and programs, a central processing unit in communication with the random-access memory for executing programs stored in the memory, a keyboard in communication with the random-access memory for entering data and programs into the memory, and an input/output channel, the input/output channel including a computer video-signal output port and a digital-signal output port, the input/output channel being adapted to generate at the computer video-signal output port a computer video signal for driving a video display monitor and to generate digital signals at the digital-signal output port in response to output commands from the central processing unit;

(a.2) a video display monitor having a video-display-monitor video-signal input port, the video display monitor being adapted to display visual images in response to video signals applied to the video-signal input port;

(a.3) a video-tape cassette player having a video-player video-signal output port and a video-player control-signal input port, the video-tape cassette player being adapted to play a video tape cassette mounted in the player in response to video-player start/stop control signals applied to the video-player control-signal input port, the video signal obtained from the video tape cassette being produced at the video-player-video-signal output port;

(a.4) an interface controller having a computer video-signal input port, a video-player video-signal input port, a display-monitor video-signal output port, a computer digital-control-signal input port, and a video-player control-signal output port, the interface controller being adapted to connect the display monitor video-signal output port to one of the computer video-signal input port or the video-player video-signal input port in response to a video-signal-selection control signal applied to the computer digital-control-signal input port, the interface controller being adapted to produce video-player start/stop control signals at the video-player control-signal output port in response to video-player start/stop control signals applied to the computer digital-control-signal input port for controllably starting and stopping the playing of a video tape cassette in the video-tape cassette player;

(a.5) video-signal transmission means connecting respectively (i) the video-player video-signal output port of the video-tape cassette player to the video-player video-signal input port of the interface controller, (ii) the computer video-signal output port of the digital computer to the computer video-signal input port of the interface controller, and (iii) the display-monitor video-signal output port of the interface controller to the video-display-monitor video-signal input port of the video display monitor;

(a.6) control-signal transmission means connecting respectively (i) the digital signal output port of the input/output channel of the digital computer to the computer digital-control-signal input port of the interface controller and (ii) the video-player control-signal output port of the interface controller to the video-player control-signal input port of the video-tape cassette player;

(a.7) a speaker telephone;

(a.8) a voice/data modem having a data-channel port, a voice-channel port and a telephone line connection port adapted to be connected to a telephone system;

(a.9) digital-signal transmission means connecting the input/output channel of the digital computer to the data-channel port of the voice/data modem; and (a.10) voice-telephonic signal transmission means connecting the voice-channel port of the voice/data modem to the speaker telephone; and (b) a plurality of student stations, each student station being connectable to the teacher station over a telephone sysem, each student station including:

(b.1) a digital computer having random-access memory for storing data and programs, a central processing unit in communication with the random-access memory for executing programs stored in the memory, a keyboard in communication with the random-access memory for entering data and programs into the memory, and an input/output channel, the input/output channel including a computer video-signal output port and a digital-signal output port, the input/output channel being adapted to generate at the computer video-signal output port a computer video signal for driving a video display monitor and to generate digital signals at the digital-signal output port in response to output commands from the central processing unit;

(b.2) a video display monitor having a video-display-monitor video-signal input port, the video display monitor being adapted to display visual images in response to video signals applied to the video-signal input port;

(b.3) a video-tape cassette player having a video-player video-signal output port and a video-player control-signal input port, the video-tape cassette player being adapted to play a video tape cassette mounted in the player in response to video-player start/stop control signals applied to the video-player control-signal input port, the video signal obtained from the video tape cassette being produced at the video-player video-signal output port;

(b.4) an interface controller having a computer video-signal input port, a video-player video-signal input port, a display monitor video-signal output port, a computer digital-control-signal input port, and a video-player control-signal output port, the interface controller being adapted to connect the display monitor video-signal output port to one of the computer video-signal input port or the video-player video-signal input port in response to a video-signal-selection control signal applied to the computer digital-control-signal input port, the interface controller being adapted to produce video-player start/stop control signals at the video-player control-signal output port in response to video-player start/stop control signals applied to the computer digital-control-signal input port for controllably starting and stopping the playing of a video tape cassette in the video-tape cassette;

(b.5) video-signal transmission means connecting respectively (i) the video-player video-signal output port of the video-tape cassette player to the video-player video signal input port of the interface controller, (ii) the computer video-signal output port of the digital computer to the computer video-signal input port of the interface controller, and (iii) the display-monitor video-signal output port of the interface controller to the video-display-monitor video-signal input port of the video display monitor;

(b.6) control-signal transmission means connecting respectively (i) the digital signal output port of the input/output channel of the digital computer to the computer digital-control-signal input port of the interface controller and (ii) the video-player control-signal output port of the interface controller to the video-player control-signal input port of the video-tape cassette player;

(b.7) a speaker telephone;

(b.8) a voice/data modem having a data-channel port, a voice channel port and a telephone line connection port adapted to be connected to the telephone system for voice/data communication with the teaching station and with other student stations;

(b.9) digital-signal transmission means connecting the input/output channel of the digital computer and the data-channel port of the voice/data modem; and (b.10) voice telephonic signal transmission means connecting the voice-channel port of the voice/data modem and the speaker telephone.

* * * * *